United States Patent
Hamada

(10) Patent No.: US 8,736,744 B2
(45) Date of Patent: May 27, 2014

(54) DIGITAL PHOTOGRAPHING APPARATUS AND METHOD OF CONTROLLING THE SAME

(75) Inventor: Masataka Hamada, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 573 days.

(21) Appl. No.: 12/948,070

(22) Filed: Nov. 17, 2010

(65) Prior Publication Data

US 2011/0115939 A1 May 19, 2011

(30) Foreign Application Priority Data

Nov. 18, 2009 (KR) ........................ 10-2009-0111542

(51) Int. Cl.
*G03B 13/00* (2006.01)
*H04N 5/232* (2006.01)

(52) U.S. Cl.
USPC .......................................... 348/353; 323/346

(58) Field of Classification Search
USPC .................... 348/345, 346, 349, 353
See application file for complete search history.

(56) References Cited

U.S. PATENT DOCUMENTS

| 7,526,192 | B2 * | 4/2009 | Nakahara ....................... 396/104 |
| 7,973,852 | B2 * | 7/2011 | Ito et al. ......................... 348/349 |
| 8,139,137 | B2 * | 3/2012 | Chiang et al. ................. 348/345 |
| 8,289,439 | B2 * | 10/2012 | Yasuda .......................... 348/349 |
| 2003/0048373 | A1 * | 3/2003 | Okisu et al. .................... 348/350 |
| 2005/0253955 | A1 * | 11/2005 | Sato ............................... 348/345 |
| 2012/0038818 | A1 * | 2/2012 | Hamada ........................ 348/349 |

FOREIGN PATENT DOCUMENTS

| CN | 1696815 A | 11/2005 |
| JP | 2006-064855 A | 3/2006 |

OTHER PUBLICATIONS

Office Action issued for CN 201010566352.5 (Feb. 28, 2014).

* cited by examiner

*Primary Examiner* — Daniel M Pasiewicz
(74) *Attorney, Agent, or Firm* — Drinker Biddle & Reath LLP

(57) ABSTRACT

A digital photographing apparatus and a method of controlling the digital photographing apparatus are provided. The digital photographing apparatus stores an image signal in a memory at the same time with the calculation of a horizontal AF evaluation value with respect to the image signal, and calculates a vertical AF evaluation value by using the stored image signal. Accordingly, exact AF detection may be performed with respect to images of all patterns.

19 Claims, 19 Drawing Sheets

AFareaL8[1]　　　　　　　　　AFareaL8[b]

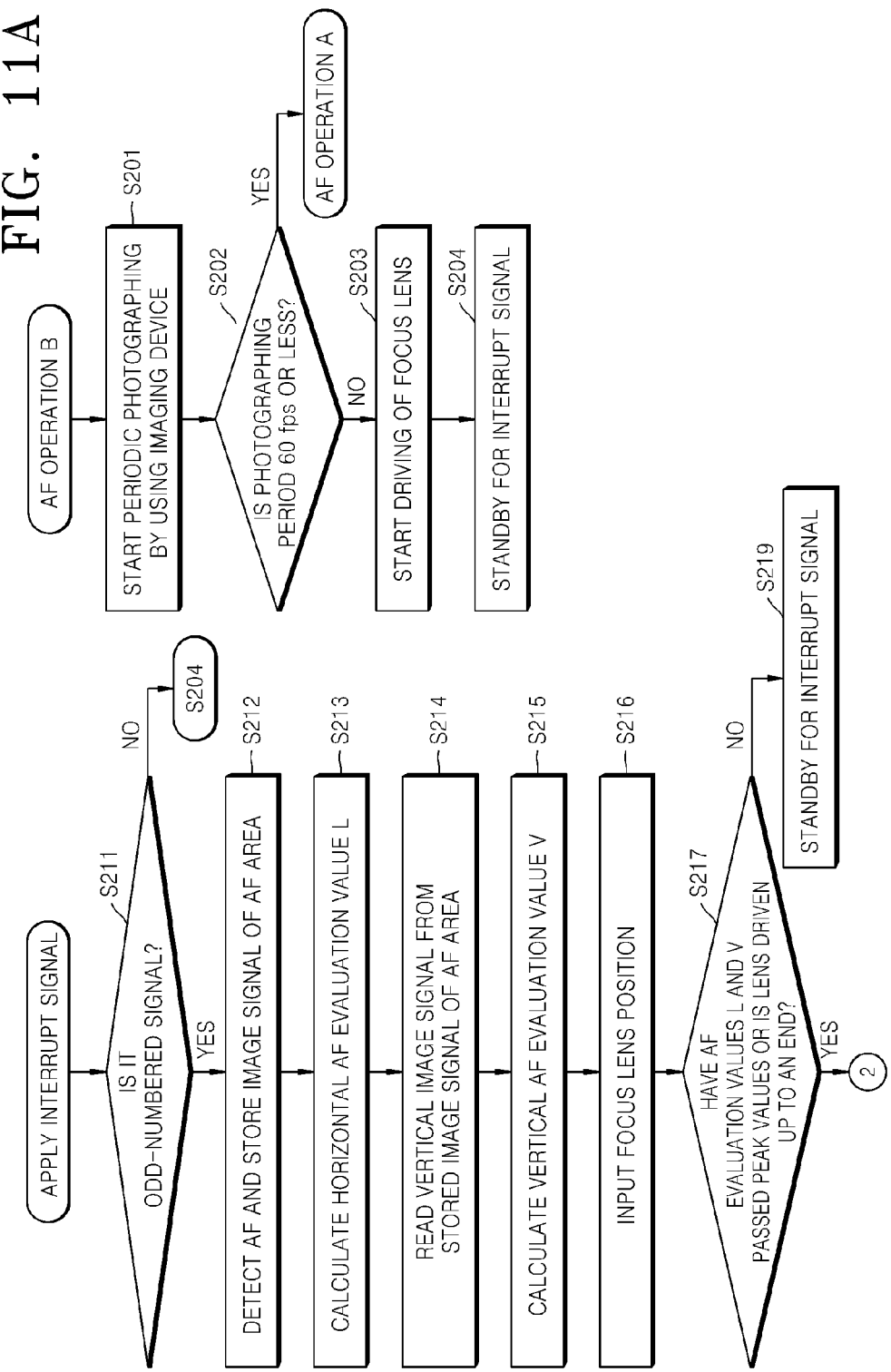

DIGITAL PHOTOGRAPHING APPARATUS AND METHOD OF CONTROLLING THE SAME

CROSS-REFERENCE TO RELATED PATENT APPLICATION

This application claims the benefit of Korean Patent Application No. 10-2009-0111542, filed on Nov. 18, 2009, in the Korean Intellectual Property Office, the disclosure of which is incorporated herein in its entirety by reference.

BACKGROUND

The invention relates to a digital photographing apparatus and a method of controlling the same.

In digital photographing apparatuses such as digital cameras and digital camcorders, focus adjustment is performed to obtain clear images. For focus adjustment, a contrast auto focusing (AF) method is usually used. The contrast AF method comprises calculating an AF evaluation value with respect to an image signal generated by an imaging device and detecting a focus position from the AF evaluation value to drive a focus lens.

In detail, in the contrast AF method, from among image signals generated by an imaging device including a plurality of photoelectric converting units that are arranged in an n×m matrix, image signals in a row direction, that is, image signals in a horizontal direction, from a first row to an n-th row, are sequentially read, and AF detection is performed with respect to the read horizontal image signals, thereby calculating AF evaluation values. Then a time when a peak of the AF evaluation values exists is detected from the variation of the generated AF evaluation values. Then a lens position at the detected time is calculated and a lens is driven to the calculated lens position, thereby performing AF.

SUMMARY

Various embodiments of the invention provide a digital photographing apparatus capable of performing exact auto focusing (AF) for an image of any pattern.

According to an embodiment of the invention, there is provided a digital photographing apparatus comprising: an imaging device comprising a plurality of photoelectric converting units for converting image light from a subject into an electric signal to generate an image signal; an imaging device control unit for generating a timing signal and controlling such that horizontal image signals are sequentially read among the image signals in synchronization with the timing signal; a memory for storing the read horizontal image signals; an AF evaluation value calculation unit for calculating horizontal AF evaluation values by using the sequentially read horizontal image signals and calculating vertical AF evaluation values by sequentially reading vertical image signals from the image signals stored in the memory; and a main control unit for performing an AF operation by using the horizontal AF evaluation values or the vertical AF evaluation values.

When the calculation of the horizontal AF evaluation values is completed, the vertical AF evaluation values may be calculated.

The horizontal AF evaluation values and the vertical AF evaluation values may be calculated for every predetermined number of timing signals.

The predetermined number may vary according to a period of the timing signal.

A ratio of the horizontal AF evaluation values and the vertical AF evaluation values may vary according to time needed for calculation of the vertical AF evaluation values.

The main control unit may perform an AF operation by using the vertical AF evaluation values when the horizontal AF evaluation values are less than a reference value or by using the horizontal AF evaluation values when the vertical AF evaluation values are less than a reference value.

When a focus position is not to be detected by using either the horizontal AF evaluation values or the vertical AF evaluation values, the focus position may be detected by using other AF evaluation values.

The main control unit may perform an AF operation by using the horizontal AF evaluation values while driving a lens from one side to the other side, and an AF operation is performed by using the vertical AF evaluation values while driving the lens in a reverse direction.

The horizontal image signals may be stored in the memory at the same time with the calculation of the horizontal AF evaluation values.

The AF evaluation value calculation unit may start calculation of the vertical AF evaluation values when all of the image signals included in the AF area are stored in the memory by reading the horizontal image signals.

According to another embodiment of the invention, there is provided a method of controlling a digital photographing apparatus, the method comprising: generating an image signal by converting image light from a subject into an electric signal; sequentially reading horizontal image signals among the image signal in synchronization with a timing signal; storing the read horizontal image signals; calculating a horizontal AF evaluation value by using the sequentially read horizontal image signals; sequentially reading vertical image signals from the image signal stored in a memory; calculating a vertical AF evaluation value by using the read vertical image signals; and performing an AF operation by using the horizontal AF evaluation values or the vertical AF evaluation values.

BRIEF DESCRIPTION OF THE DRAWINGS

The above and other features and advantages of the invention will become more apparent by describing in detail exemplary embodiments thereof with reference to the attached drawings in which:

FIGS. 11A and 11B are a flowchart illustrating a method of FIG. 10 of controlling a digital photographing apparatus, according to an embodiment of the invention;

DETAILED DESCRIPTION

The invention will now be described more fully with reference to the accompanying drawings, in which exemplary embodiments of the invention are shown.

Structure and Operation of Digital Photographing Apparatus

Figure 1:
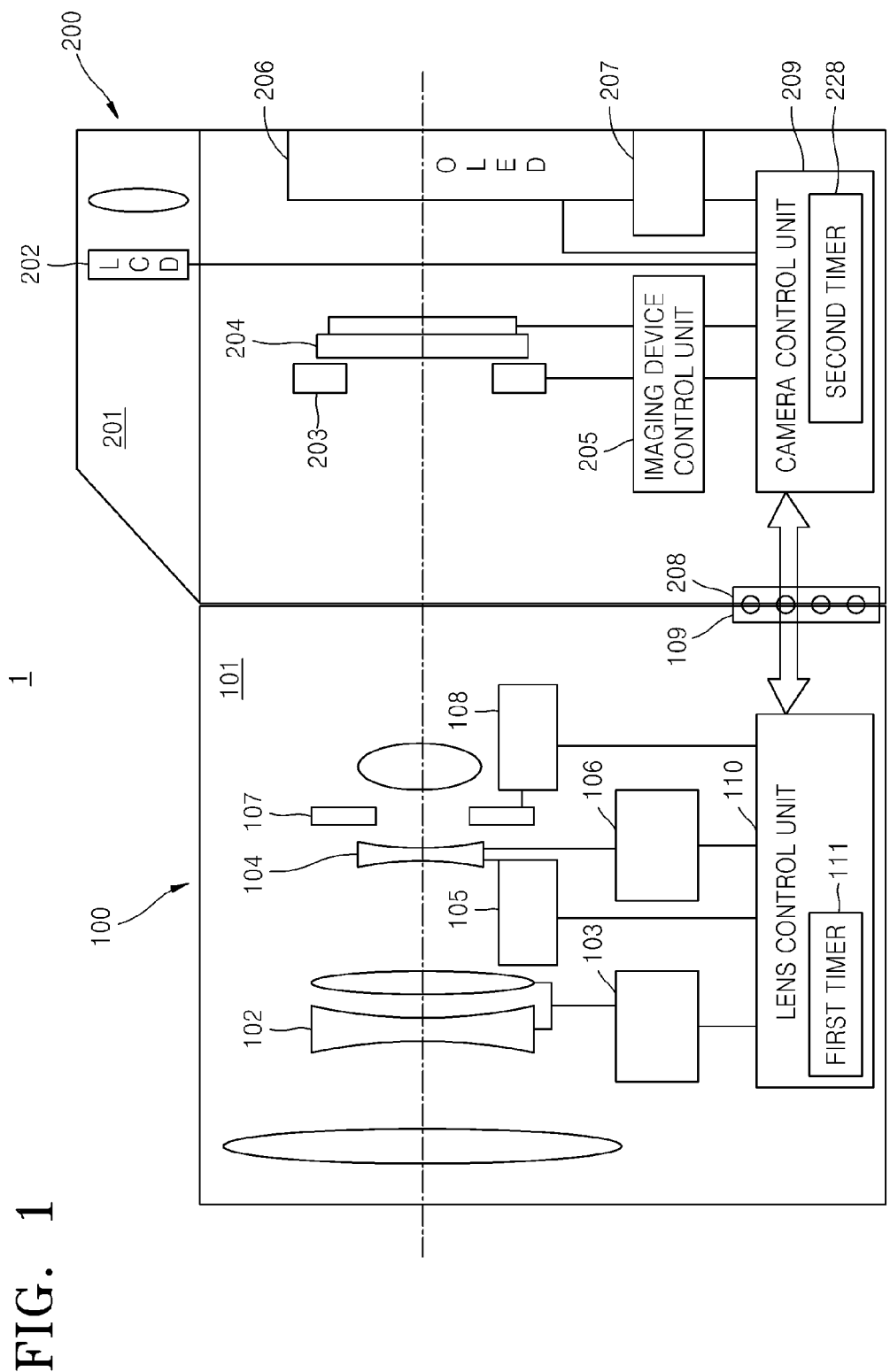
FIG. 1 is a schematic pictorial side view illustrating a digital photographing apparatus according to an embodiment of the invention.

FIG. 1 is a schematic view illustrating a digital photographing apparatus 1 according to an embodiment of the invention.

Referring to FIG. 1, the digital photographing apparatus 1 includes an interchangeable lens 100 and a main body portion 200. The interchangeable lens 100 includes a focal point detection function, and the main body portion 200 has the function of allowing the interchangeable lens 100 to drive a focus lens 104.

The interchangeable lens 100, hereinafter, referred to as the lens 100, includes an imaging optical system 101, a zoom lens position detecting sensor 103, a lens driving actuator 105, a focus lens position detecting sensor 106, an aperture driving actuator 108, a lens control unit 110, and a lens mount 109.

The imaging optical system 101 includes a zoom lens 102 for zoom adjustment, the focus lens 104 for changing a focal position, and an aperture 107. The zoom lens 102 and the focus lens 104 may be formed of a lens group including a plurality of lenses.

The zoom lens position detecting sensor 103 and the focus lens position detecting sensor 106 sense a position of the zoom lens 102 and the focus lens 104, respectively. Timing of detecting the position of the focus lens 104 may be set by the lens control unit 110 or a camera control unit 209 which is described later. For example, timing for detecting a position of the focus lens 104 may be a timing of performing AF detection from an image signal.

The lens driving actuator 105 and the aperture driving actuator 108 are controlled by the lens control unit 110 to drive the focus lens 104 and the aperture 107, respectively. In particular, the lens driving actuator 105 drives the focus lens 104 in an optical axis direction.

The lens control unit 110 includes a first timer 111 for time measurement. Also, the lens control unit 110 transmits detected position data of the focus lens 104 to the main body portion 200. If the position of the focus lens 104 is changed or if a request for position data of the focus lens 104 is sent from the camera control unit 209, the lens control unit 110 may transmit the detected position data of the focus lens 104 to the main body portion 200. Also, the first timer 111 may be reset by a reset signal transmitted from the main body portion 200, and the timings of the lens 100 and the main body portion 200 may be synchronized by the resetting operation.

The lens mount 109 includes a communication pin of the lens 100, which is coupled to a communication pin of a camera to be described later, thereby being used as a transmission path for data, control signals, etc.

Next, a structure of the main body portion 200 will be described.

The main body portion 200 may include an electronic view finder (EVF) 201, a shutter 203, an imaging device 204, an imaging device control unit 205, a display unit 206, a manipulation unit 207, a camera control unit 209, and a camera mount 208.

The EVF 201 may include a liquid crystal display (LCD) 202, and an image being captured may be viewed in real-time through the EVF 201.

The shutter 203 determines the time during when light is incident to the imaging device 204, that is, an exposure time.

The imaging device 204 captures image light that has transmitted through the imaging optical system 101 of the lens 100 to generate an image signal. The imaging device 204 may include a plurality of photoelectric converting units that are arranged in a matrix and a vertical and/or horizontal transmission path for reading an image signal from the photoelectric converting units by moving charges. The imaging device 204 may be a charge-coupled device (CCD) sensor, a complementary metal-oxide semiconductor (CMOS) sensor or the like.

The imaging device control unit 205 generates a timing signal, and controls the imaging device 204 to be synchronized with the timing signal to capture an image. Also, the imaging device control unit 205 allows that horizontal image signals are sequentially read when charge accumulation is completed in each scanning line. The read horizontal image signals are used in AF detection in the camera control unit 209.

The display unit 206 displays various images and data. For example, the display unit 206 may be an organic light emitting diode (OLED) display apparatus.

The manipulation unit 207 is a unit through which various commands of the user are input for manipulating the digital photographing apparatus 1. The manipulation unit 207 may include various buttons such as a shutter release button, a main switch, a mode dial, a menu button or the like.

The camera control unit 209 performs AF detection with respect to an image signal generated by the imaging device 204 to calculate an AF evaluation value. Also, the camera control unit 209 stores AF evaluation values at each of the AF detection times according to timing signals generated by the imaging device control unit 205, and calculates a focus position by using lens position information transmitted from the lens 100 and the stored AF evaluation values. Results of the calculation of the focus position are transmitted to the lens 100. The camera control unit 209 may include a second timer 228 for time measurement, wherein the second timer 228 may be reset at the same time with the first timer 111 so that the lens 100 and the main body portion 200 may measure identical times.

The camera mount 208 includes a communication pin of the main body portion 200.

Hereinafter, an operation of the lens 100 and the main body portion 200 will be described.

When photographing a subject, a main switch included in the manipulation unit 207 is manipulated to initiate an operation of the digital photographing apparatus 1. The digital photographing apparatus 1 provides a live view display in the following manner.

Image light of a subject that has transmitted through the imaging optical system 101 is incident to the imaging device 204. Here, the shutter 203 is open. The incident image light is converted into an electric signal in the imaging device 204, thereby generating an image signal. The imaging device 204 is operated by a timing signal generated by the imaging device control unit 205. The generated image signal of the subject is converted to data displayable by the camera control unit 209 and is output to the EVF 201 and the display unit 206. This operation is referred to as a live view display, and a live view image displayed by live view display is a moving image being continuously displayed.

After a live view display is performed, when a shutter release button, which is one of the inclusions of the manipulation unit 207, is half-pressed, the digital photographing apparatus 1 initiates an AF operation. An AF operation is performed by using an image signal generated by the imaging device 204. In a contrast AF method, a focus position is calculated based on AF evaluation values related to contrast values, and the lens 100 is driven based on results of the calculation. The AF evaluation values are calculated by the camera control unit 209. The camera control unit 209 calculates information for controlling the focus lens 104 based on the AF evaluation values, and transmits the information to the lens control unit 110 via the communication pins included in the lens mount 109 and the camera mount 208, respectively.

The lens control unit 110 controls the lens driving actuator 105 based on the received information to drive the focus lens 104 in an optical axis direction to perform an AF operation. A position of the focus lens 104 is monitored by the focus lens position detecting sensor 106, thereby providing controlling feedback.

When the zoom lens 102 zooms by manipulation of the user, a position of the zoom lens 102 is detected by the zoom lens position detecting sensor 103, and the lens control unit 110 varies AF control parameters of the focus lens 104 to perform AF again.

When a focal point of a subject image is adjusted in the above-described manner, the shutter release button is completely pressed (S2), and the digital photographing apparatus 1 performs exposure. The camera control unit 209 here completely closes the shutter, and transmits photometry information obtained until this point to the lens control unit 110 as aperture control information. The lens control unit 110 controls the aperture driving actuator 108 based on the aperture control information, and the aperture 107 gets smaller with appropriate aperture values. The camera control unit 209 controls the shutter 203 based on the photometry information, and opens the shutter 204 for an appropriate period of exposure time, thereby capturing a subject image that has been captured.

Image signal processing and compression are performed on the captured image, and the captured image is stored in a memory card 212. Also, the captured image is output to the EVF 201 and the display unit 206 for displaying a subject at the same time. This image is called a quick view image.

A series of photographing operations are completed as in the above-described manner.

Figure 2:
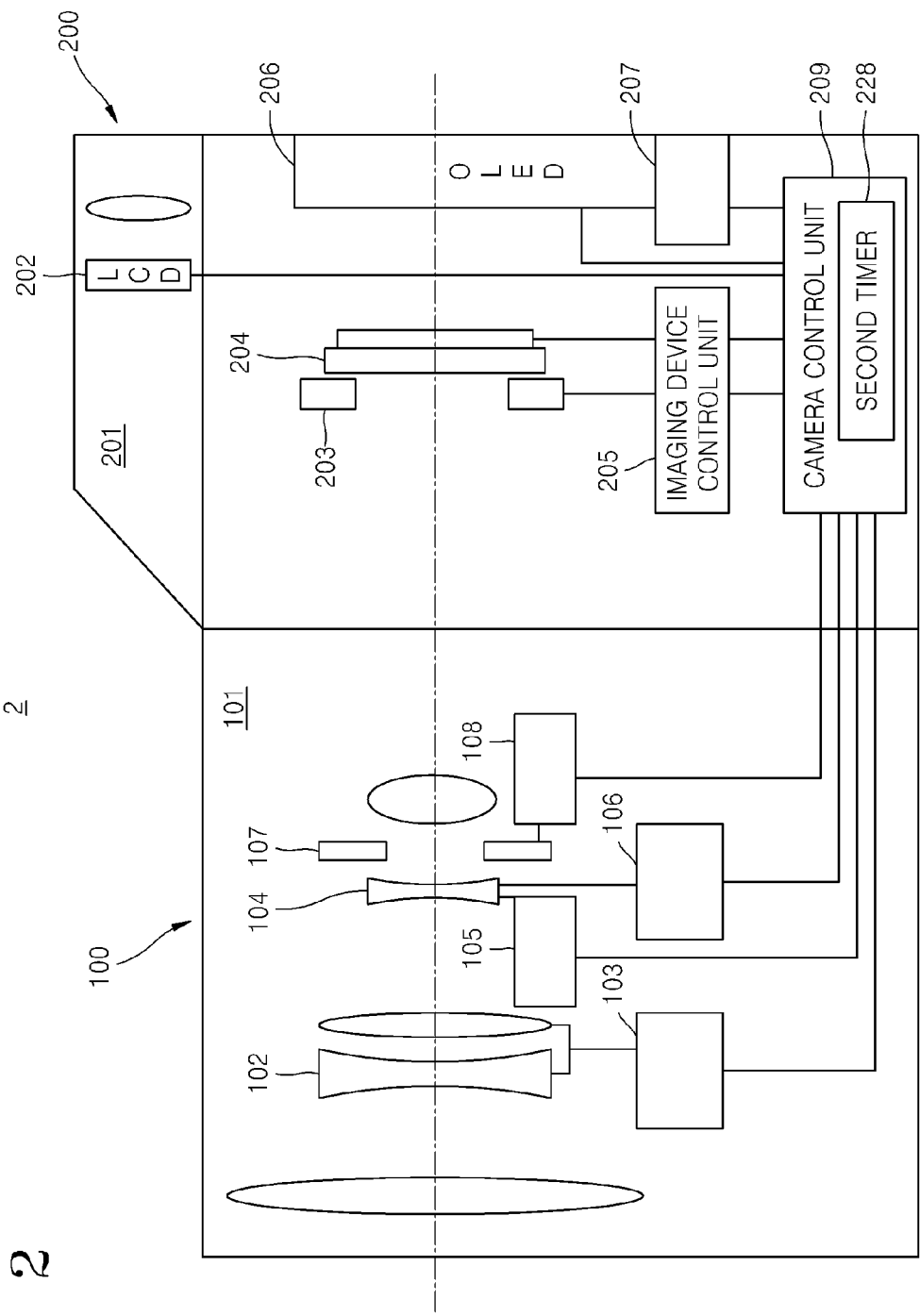
FIG. 2 is a schematic pictorial side view illustrating a digital photographing apparatus according to another embodiment of the invention.

FIG. 2 is a schematic view illustrating a digital photographing apparatus 2 according to another embodiment of the invention.

The digital photographing apparatus 2 has a similar structure and similar functions as the digital photographing apparatus 1 and thus the following description will focus on differences between them. In the digital photographing apparatus 2, a lens 100 and a main body portion 200 are integrally formed, and thus the lens 100 is not changeable. Also, since the lens 100 and the main body portion 200 are integrally formed, the lens mount 109 and the camera mount 208 of FIG. 1 are not included. Accordingly, the camera control unit 209 directly controls the lens driving actuator 105, the aperture driving actuator 108, etc. to drive the zoom lens 102, the focus lens 104, and the aperture 107. Also, the camera control unit 209 directly receives position information from the zoom lens position detecting sensor 103 and the focus lens position detecting sensor 106. That is, the camera control unit 209 according to the current embodiment performs the function of the lens control unit 110 of FIG. 1.

Also, according to the current embodiment, AF evaluation values and lens positions are synchronized by using the second timer 228.

Structure and Operation of the Camera Control Unit

Figure 3:
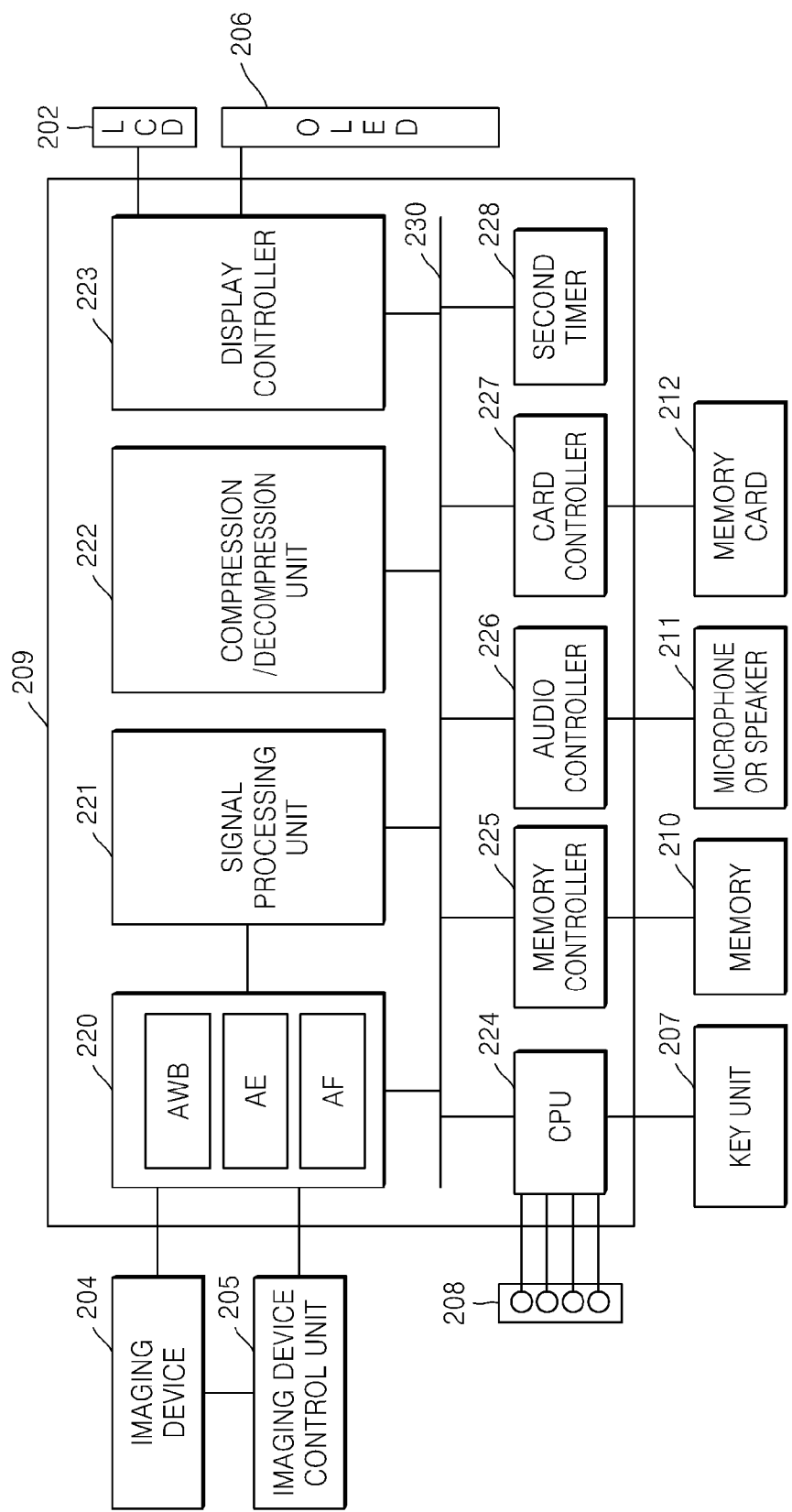
FIG. 3 is a block diagram illustrating a camera control unit according to an embodiment of the invention.

FIG. 3 is a block diagram illustrating the camera control unit 209 according to an embodiment of the invention.

Referring to FIG. 3, the camera control unit 209 may include a pre processing unit 220, a signal processing unit 221, a compression/decompression unit 222, a display controller 223, a central processing unit (CPU) 224, a memory controller 225, an audio controller 226, a card controller 227, a second timer 228, and a main bus 230.

The camera control unit 209 transmits commands and data to each element via the main bus 230.

The pre processing unit 220 receives an image signal generated by the imaging device 204 and performs calculations of auto white balance (AWB), auto exposure (AE), and AF. That is, AF evaluation values for focus adjusting, AE evaluation values for exposure adjustment, and AWB evaluation values for white balance adjustment are calculated. The AF evaluation values may include horizontal AF evaluation values denoting horizontal contrast and vertical AF evaluation values denoting vertical contrast. The horizontal AF evaluation values are calculated by directly receiving horizontal image signals read from the imaging device 204. On the other hand, the vertical AF evaluation values may be calculated by storing the horizontal image signals in the memory 210, which is described later, and then reading the stored horizontal image signals as a vertical image signal component. That is, the pre processing unit 220 may be an example of an AF evaluation value calculation unit.

The signal processing unit 221 performs a series of image signal processing operations such as gamma correction to create a live view image or a captured image that are displayable on the display unit 206.

The compression/decompression unit 222 performs compression or decompression to an image signal to which image signal processing is performed. Regarding compression, for example, the image signal is compressed in a JPEG compression format or an H.264 compression format. An image file including image data generated by the compression is transmitted to the memory card 212 to be stored thereto.

The display controller 223 controls image output to a display screen such as the LCD 202 of the EVF 201 or the display unit 206.

The CPU 224 controls operations of the units of the main body portion 200 of FIG. 1 overall. Also, the CPU 224 of the digital photographing apparatus 1 of FIG. 1 performs communication with the lens 100.

The memory controller 225 controls the memory 210 that temporarily stores data such as a captured image or calculation information, and the audio controller 226 controls a microphone or speaker 211. Also, the card controller 227 controls the memory card 212 that stores a captured image.

Meanwhile, when the horizontal image signals are read from the imaging device 204, the memory controller 225 sequentially stores the read horizontal image signals to the memory 210. The storage location of the horizontal image signals may be determined by the memory controller 225. According to the current embodiment, a vertical image signal component needs to be sequentially read with respect to an image signal corresponding to an AF detection area subsequently. Accordingly, the memory controller 225 controls such that the horizontal image signals are stored in the memory 210 so that reading of the vertical image signal is easily performed.

The second timer 228 is reset with the first timer 111 at the same time, thereby measuring time.

Hereinafter, an operation of the camera control unit 209 will be described.

When manipulation of the manipulation unit 207 is sensed by the CPU 224, the CPU 224 operates the imaging device control unit 205 via the pre processing unit 220. The imaging device control unit 205 outputs a timing signal to operate the imaging device 204. When an image signal is input to the pre processing unit 220 from the imaging device 204, AWB and AE calculations are performed. Results of the AWB and AE calculations are sent to the imaging device control unit 205 so that image signals of appropriate color and appropriate exposure are obtained from the imaging device 204.

When the operation of the digital photographing apparatus 1 or 2 is started, a live view display is conducted. The camera control unit 209 inputs an image signal of an image that is captured with appropriate exposure, to the pre processing unit 221 to calculate an AE evaluation value, etc. An image signal for a live view display is directly applied to the signal processing unit 221 without passing through the main bus 230, and the signal processing unit 221 performs on the image signal image signal processing such as interpolation processing of pixels. An image signal to which image signal processing is performed passes through the main bus 230 and the display controller 223 and an image of the image signal is displayed on the LCD 202 or the display unit 206. Basically, the live view display is renewed at 60 frames per second (fps) but is not limited thereto, and may also be renewed at, for example, 120 fps, 180 fps, or 240 fps. A renewal rate is set by the CPU 224 according to results of photometry or AF conditions, and setting of the renewal rate may be performed by the imaging device control unit 205 by changing a timing signal.

When a shutter release button is half-pressed, the CPU 224 senses inputting of a half-pressing signal S1, and commands the lens control unit 110 to initiate driving of the focus lens 104 for an AF operation via communication pins included in the camera mount 208 and the lens mount 109. Alternatively, upon sensing inputting of a half-pressing signal S1, the CPU 224 directly controls driving of the focus lens 104 for an AF operation. That is, the CPU 224 may be an example of a main control unit.

The CPU 224 obtains an image signal from the imaging device 204, and the pre processing unit 220 calculates an AF evaluation value. The AF evaluation value is calculated based on movement of the focus lens 104. A position of the focus lens 104 at which contrast of a subject image is highest, that is, where an AF evaluation value is greatest, is calculated based on a change of AF evaluation values, and the focus lens 104 is moved to the calculated position. The above-described operations are referred to as an AF operation, and a live view image is continuously displayed during the AF operation. The image signal used for the live view image and the image signal used in calculating an AF evaluation value are the same image signal.

Meanwhile, in the digital photographing apparatus 1 using the lens 100, as illustrated in FIG. 1, communication pins installed to the camera mount 208 and the lens mount 109 are used for communication between the lens 100 and the main body portion 200, and normally, the communication pins operate in serial communication to transmit lens information or control information. In the serial communication, time delay is generated. However, if position information of the focus lens 104 with respect to an AF evaluation value is not recorded without a time delay, exact AF adjustment is not possible. In order that the main body unit 200 provides a timing for obtaining an AF evaluation value to the lens 100 or reduce time for transmitting a position of the focus lens 104 from the lens 100 to the main body portion 200, the time delay of serial communication needs to be extremely reduced with respect to a moving speed of the focus lens 104. However, it is difficult to extremely reduce the time delay of serial communication. Thus, a communication pin for adjusting synchronization may be installed. However, if communication pins that are used only for adjusting synchronization are included, the number of communication pins increases, thereby increasing the size of the camera mount 208 and the lens mount 109 and also the manufacturing costs of the digital photographing apparatus 1. Accordingly, according to the current embodiment of the invention, a timer function for adjusting synchronization between the lens 100 and the main body portion 200 is included. Also, a predetermined communication pin is set to operate in real-time communication at first, and then after the timer function of the lens 100 is reset by the real-time communication, the communication pin is set to operate in serial communication, which is non-real-time communication.

A position of the focus lens 104 at which contrast is greatest, that is, a peak position of an AF evaluation value, may be calculated based on the knowledge of a track of positions of the focus lens 104 at which the imaging device 204 obtains an image signal and a transition in AF evaluation values.

Next, an AF area, which is an object of calculation of AF evaluation values when performing an AF operation, will be described.

Figure 4:
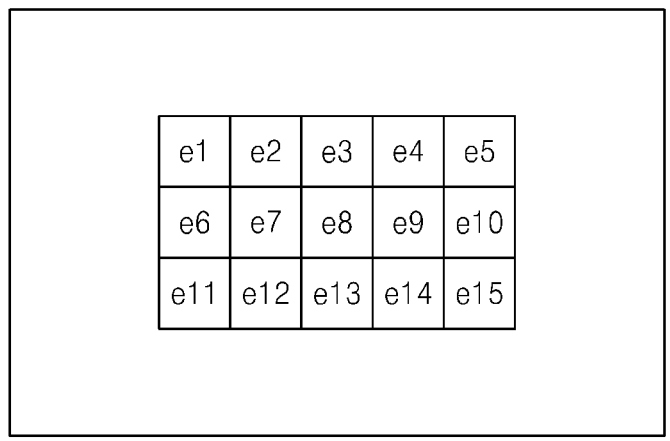
FIG. 4 is a pictorial image illustrating an auto focusing (AF) area.
Figure 5:
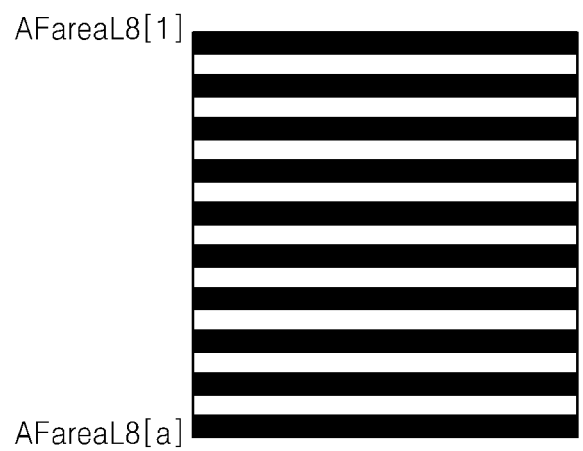
FIG. 5 is a pictorial image illustrating scanning lines in an area e8.
Figure 6:
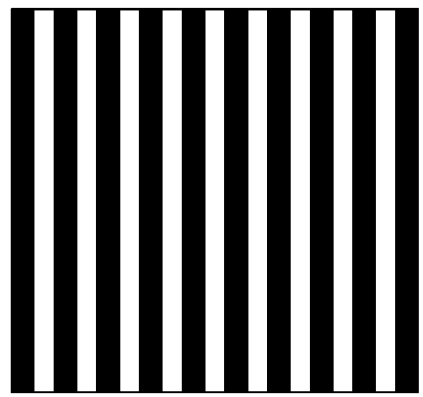
FIG. 6 is a pictorial conceptual diagram illustrating an image signal included in the area e8, divided into vertical image signals.

FIG. 4 illustrates an auto focusing (AF) area, and FIG. 5 illustrates a scanning line in an area e8. FIG. 6 is a conceptual diagram illustrating an image signal included in the area e8, divided into a plurality of vertical image signals.

As illustrated in FIG. 4, an AF area, which is divided into fifteen areas in a 3×5 formation symmetrically, is set. Hereinafter, the area e8 will be described as an AF detection area according to various embodiments of the invention.

In the imaging device 204, first through n-th scanning lines are sequentially arranged from top, and a plurality of scanning lines of AFareaL8[1] through AFareaL8[$a$] are included in the area e8 as illustrated in FIG. 5. According to the controlling of the imaging device control unit 205, the imaging device 204 sequentially outputs a horizontal image signal of the first scanning line to a horizontal image signal of the n-th scanning line.

Meanwhile, when dividing an image signal of the area e8 in a vertical direction, the image signal is formed of b vertical image signals from AFareaL8[1] through AFareaL8[$b$]. A vertical image signal is not of a form that can be directly read from the imaging device 204, and thus the read horizontal image signal is first stored in the memory 210. The memory controller 225 reads a vertical image signal from the stored horizontal image signals later upon necessity.

Hereinafter, various examples of an AF operation by using AF evaluation values will be described in detail, wherein a digital photographing apparatus according to the embodiments of the invention is assumed to be the digital photographing apparatus 1 that uses the lens 100 of FIG. 1.

First Embodiment

Hereinafter, an AF operation according to an embodiment of the invention will be described with reference to FIGS. 7, 8, 9A, and 9B.

Operation of Digital Photographing Apparatus

Figure 7:
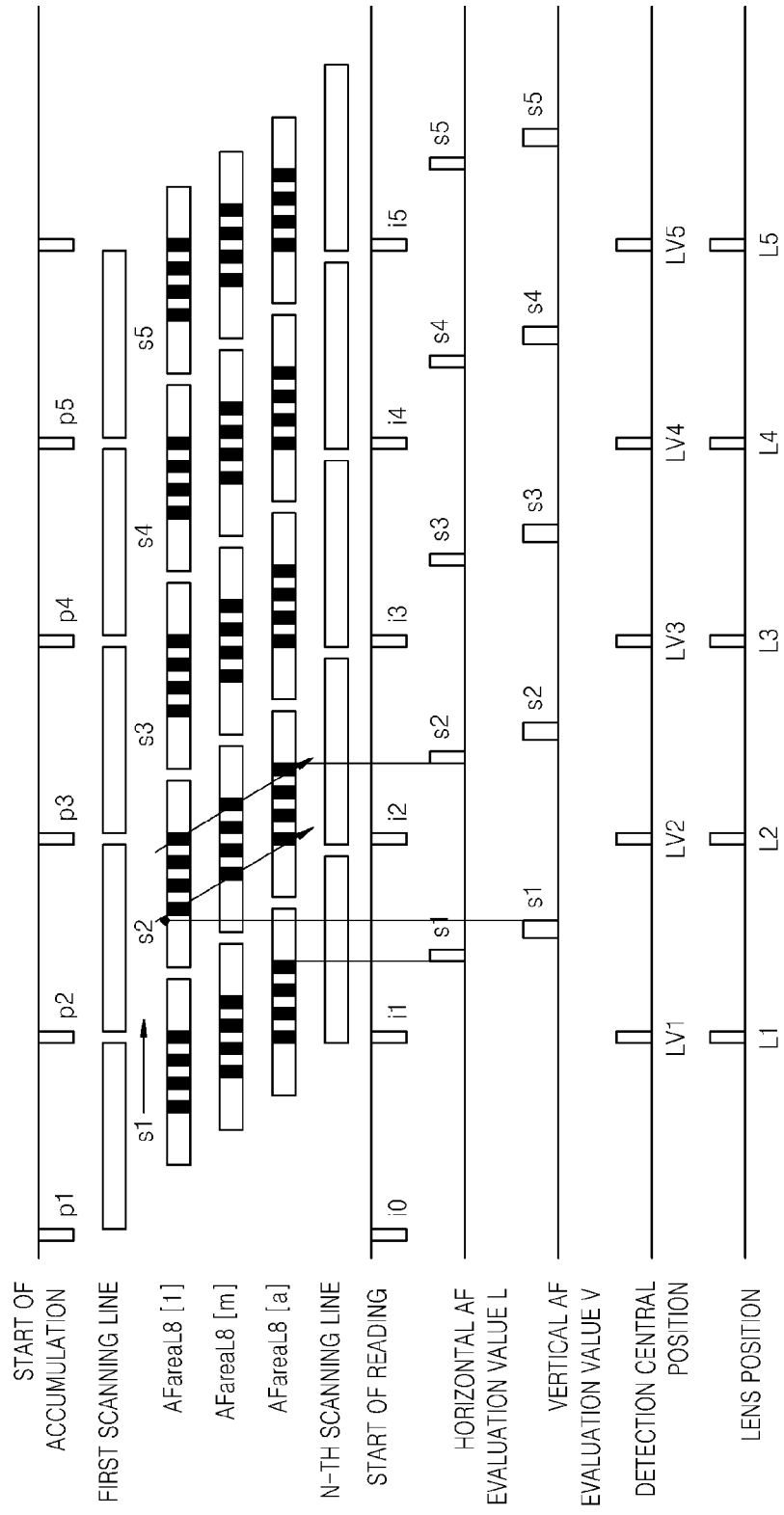
FIG. 7 is a timing diagram illustrating an AF operation of a digital photographing apparatus, according to an embodiment of the invention.

FIG. 7 is a timing diagram illustrating an AF operation of the digital photographing apparatus 1, according to an embodiment of the invention.

Referring to FIG. 7, sequentially from top, timing diagrams of an accumulation initiation signal, a charge accumulation signal of a first scanning line, charge accumulation signals AFareaL8[1] through AFareaL8[a] used in AF detection, a charge accumulation signal of an n-th scanning line, and a reading initiation signal are illustrated. Also, a calculation timing for a horizontal AF evaluation value, a calculation timing for a vertical AF evaluation value, an AF detection central position, and lens position information at the timing corresponding to the central position for the AF detection are illustrated in FIG. 7.

When accumulation initiation signals p1, p2, . . . are applied, charges generated by image light that is incident to the first through n-th scanning lines are accumulated. When the accumulation of charges of the first scanning line is completed, reading initiation signals i0, i1, . . . of an image signal are generated. According to the reading initiation signal, horizontal image signals are read sequentially from the first scanning line. The read horizontal image signals are applied to the camera control unit 209. After the accumulation of charges of AFareaL8[1] through AFareaL8[a] that are included in the area e8, which is an AF detection area, is completed, horizontal AF evaluation values L(s1), L(s2), . . . are calculated by using horizontal image signals read by the pre processing unit 220. While the horizontal AF evaluation values are calculated, the focus lens 104 continuously moves at a predetermined speed.

According to the current embodiment, not only the horizontal AF evaluation values but also vertical AF evaluation values are calculated. In a conventional contrast AF method, an AF operation is performed only by using AF evaluation values obtained from scanning lines, that is, only based on horizontal AF evaluation values, and thus when a contrast of a subject is distributed in a vertical direction, for example, regarding horizontal striped patterns, it is difficult to adjust a focal point. Thus, according to the current embodiment of the invention, vertical AF evaluation values are calculated.

However, a vertical AF evaluation value cannot be directly calculated based on a horizontal image signal read from the imaging device 204. Accordingly, referring to the timing diagram of FIG. 7, when reading horizontal image signals of AFareaL8[1] through AFareaL8[a], the horizontal image signals of AFareaL8[1] through AFareaL8[a] are transmitted to the pre processing unit 220 and also to the memory 210 at the same time to be stored there.

When all of the horizontal image signals included in the AF detection area are stored in the memory 210 and a horizontal AF evaluation value L is detected by a read horizontal image signal, a vertical image signal is read. By sequentially reading vertical image signals and detecting contrast that exists in a vertical direction with respect to each of the vertical image signals, a vertical AF evaluation value V is calculated. An image signal stored in the memory 210 may be read by using a direct memory access (DMA) method. Also, an operation of reading a vertical image signal from the memory 210 may take a shorter time than reading a horizontal image signal from the imaging device 204.

According to the current embodiment of the invention, a vertical AF evaluation value V is calculated before a horizontal image signal of an AF detection area of a subsequent period is read, and then AF detection in a horizontal direction of the subsequent period starts again.

A horizontal AF evaluation value L and a vertical AF evaluation value V are calculated for every frame by using the above-described operations.

Meanwhile, in order to detect a peak value of AF evaluation values, horizontal AF evaluation values L(s1), L(s2), . . . that are calculated for every frame and timings at which image signals used for calculating the horizontal evaluation values are obtained need to be known. The timings that the image signals are obtained are assumed to be a central time point of a period of charge accumulation times from AFareaL8[1] through AFareaL8[a], that is, a central time point between a charge accumulation initiation time of AFareaL8[1] and a charge accumulation end time of AFareaL8[a]. A detection central position illustrated in FIG. 7 corresponds to a timing when an image signal is obtained.

A lens position disposed under the detection central position corresponds to a position of the focus lens 104 corresponding to the detection central position. A position of the focus lens 104 may be obtained by communication between the lens 100 and the main body portion 200.

Hereinafter, a method of calculating a peak value of AF evaluation values from the calculated horizontal AF evaluation values L and the calculated vertical AF evaluation values V will be described.

Figure 8:
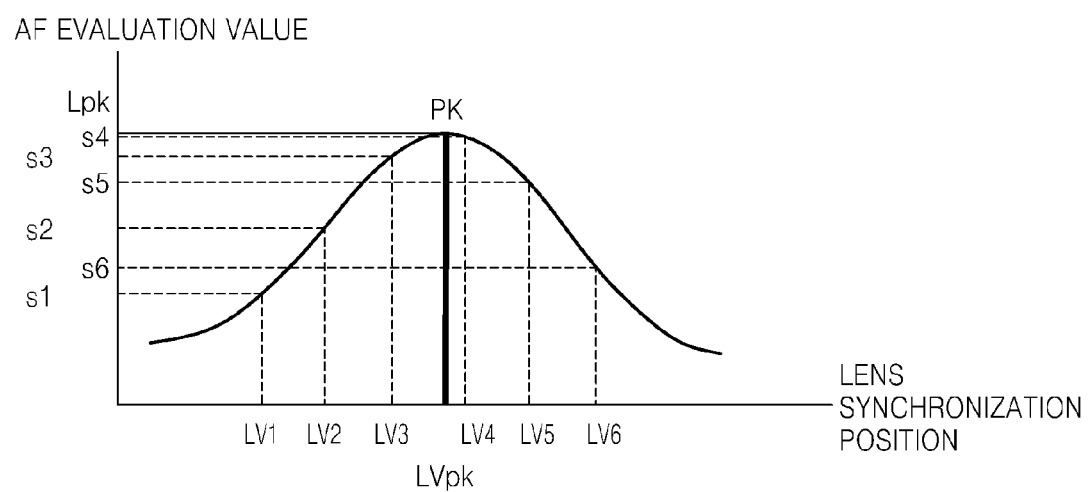
FIG. 8 is a graph illustrating detection of a peak value of AF evaluation values in a contrast AF method.

FIG. 8 is a graph illustrating detection of a peak value of AF evaluation values in a contrast AF method. In FIG. 8, a horizontal axis denotes a detection central position, and a vertical axis denotes an AF evaluation value.

The horizontal AF evaluation values are discrete and thus an actual peak value may be calculated by performing an interpolation calculation with respect to horizontal AF evaluation values. The actual peak is a point PK when a detection central position is LVpk, whereas a horizontal AF evaluation peak is Lpk. Interpolation calculation for calculating a peak value may be performed by using LV3, LV4, and LV5 and three types of data of L(s3), L(s4), and L(s5) which respectively correspond thereto.

When the peak value of the horizontal AF evaluation values is calculated, a detection central position at the timing of the peak value is determined, and a lens position is detected at a timing that is synchronized with the determined detection central position, thereby driving the focus lens 104 to a target position with an adjusted focal point.

A peak value with respect to vertical AF evaluation values may also be calculated by using the same method used regarding the horizontal AF evaluation values.

Method of Controlling Digital Photographing Apparatus

Figure 9A:
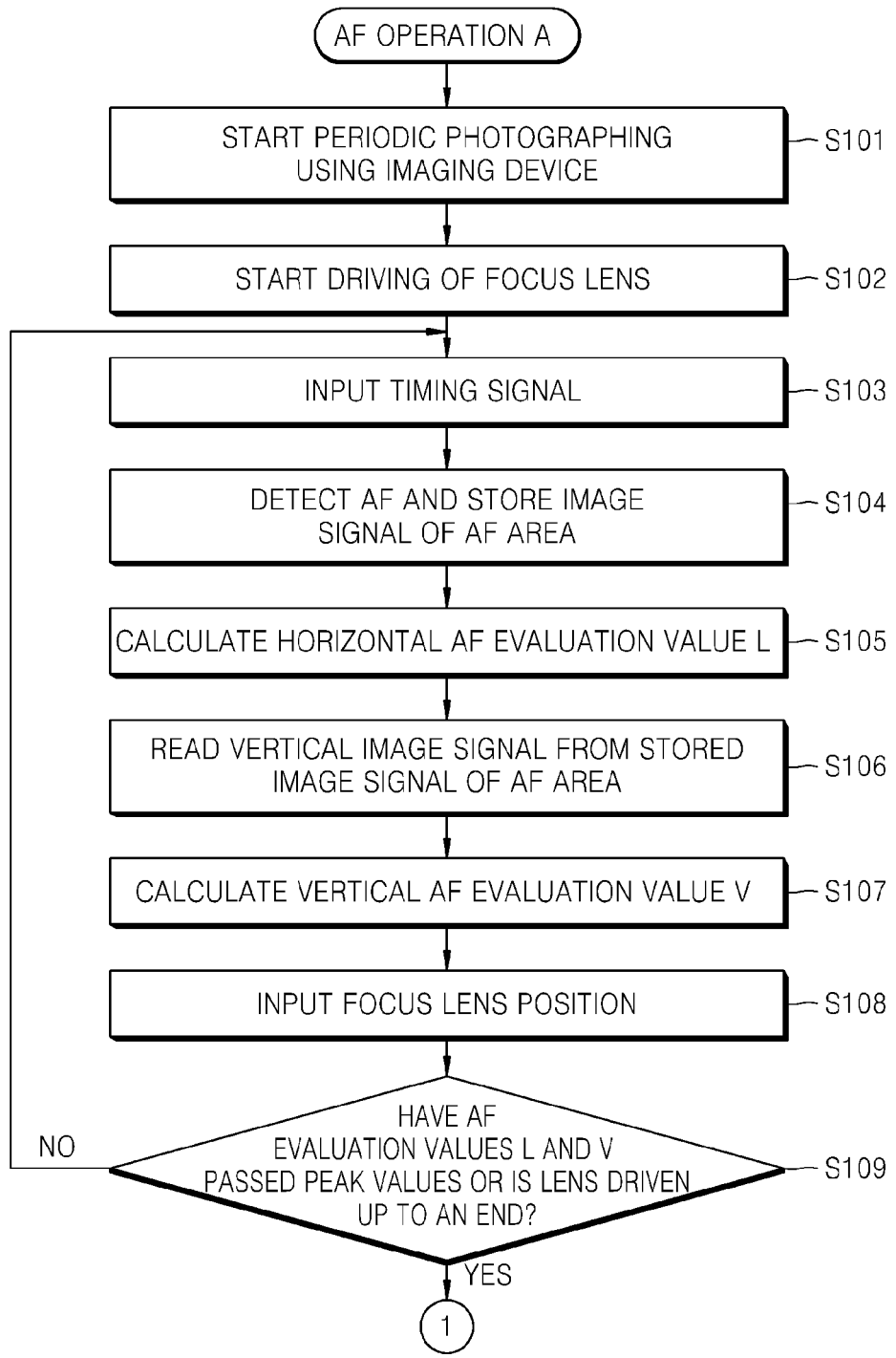
FIGS. 9A and 9B are a flowchart illustrating a method of FIG. 7 of controlling a digital photographing apparatus, according to an embodiment of the invention.
Figure 9B:
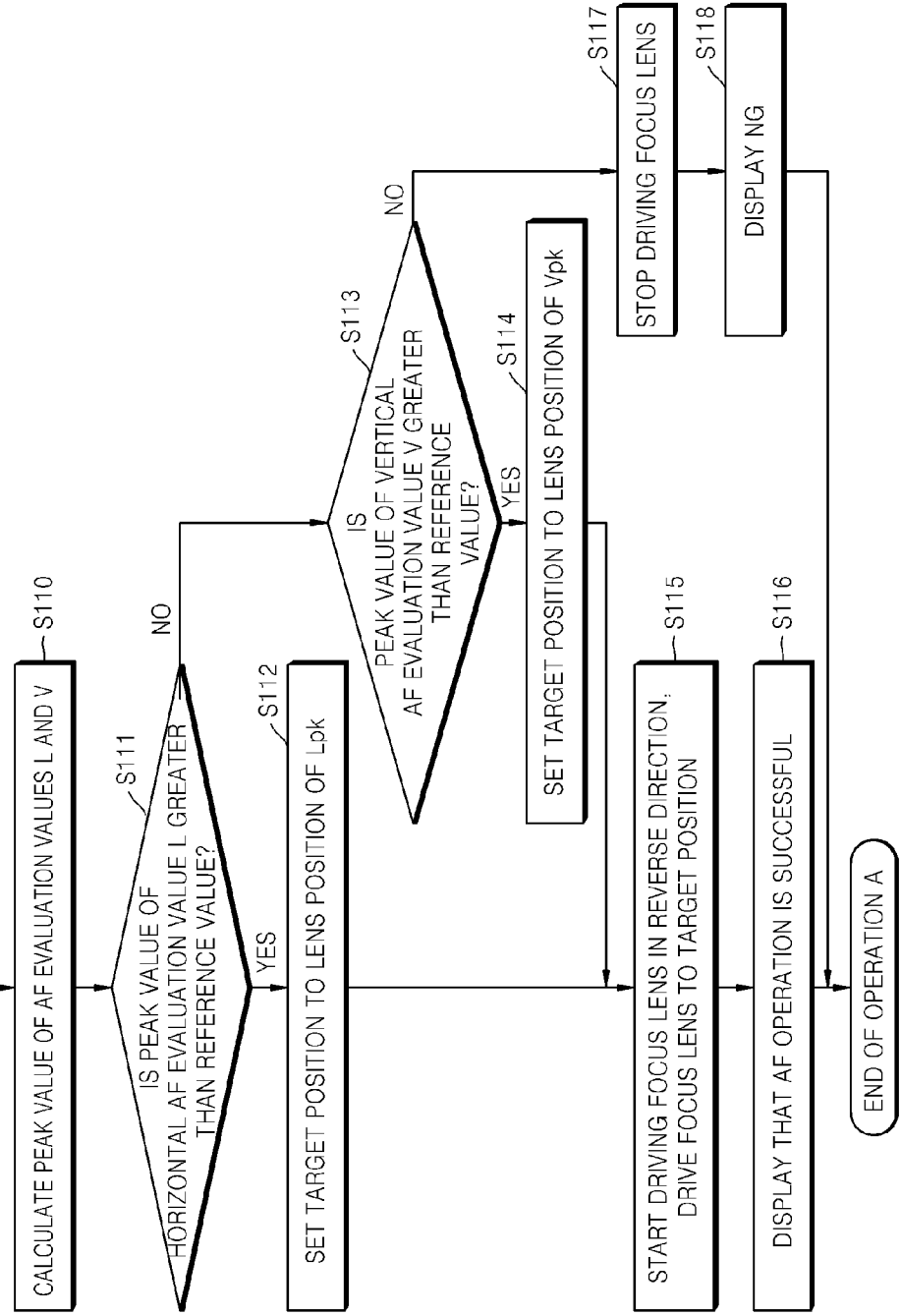

FIGS. 9A and 9B are a flowchart illustrating a method of FIG. 7 of controlling the digital photographing apparatus 1, according to an embodiment of the invention.

Power is supplied to the digital photographing apparatus 1, and when a shutter release button is half-pressed by the user, an AF operation A is started. When the AF operation A is started, an image is captured periodically by the imaging device 204 to generate an image signal in operation S101. In operation S102, since an AF operation is performed using a contrast AF method, the focus lens 104 is driven from one side to the other side. In operation S103, a photographing timing signal is input to the CPU 224. The photographing timing signal denotes a timing that initiates AF detection. The photographing timing signal is generated in correspondence with a set AF detection area. The CPU 224 counts a frequency of a driving signal is generated by the imaging device control unit 205, and determines a timing at which a predetermined frequency is counted as a timing for initiating AF detection.

When the photographing timing signal is input, an image signal of an AF area is input from the imaging device 204 to an AF detection circuit of the pre processing unit 220 in the camera control unit 209, thereby performing AF detection. At the same time, an image signal of an AF area is stored in the memory 210 in operation S104. In operation S105, a horizontal AF evaluation value L is calculated by the AF detection. After calculating a horizontal AF evaluation value, a vertical image signal of the stored image signal of the AF area is sequentially read from the memory 210 in operation S106. Reading of image signals from the memory 210 may be performed using a DMA method. In operation 107, the read vertical image signals are input to the AF detection circuit to calculate vertical AF evaluation values V. In operation S108, position information of the focus lens 104 is obtained at an AF detection timing, and is recorded together with AF evaluation values in a set.

In operation S109, while calculating horizontal and vertical AF evaluation values L and V, whether the horizontal and vertical AF evaluation values L and V have passed peak values or the focus lens 104 is driven to an end of one side is determined. Whether the horizontal and vertical AF evaluation values have passed peak values is determined by assuming an initial value of an AF evaluation value as a virtual peak value, and then the new AF evaluation value is changed to a virtual peak value if the calculated AF evaluation value according to the driving of the focus lens 104 is greater than the virtual peak value. If the new AF evaluation value is smaller than the virtual peak value, it is determined that a peak value of the AF evaluation values had existed during AF detection. If the focus lens 104 is not driven to an end of one side yet and a peak value is not detected, the method goes back to operation S103 to further calculate AF evaluation values.

Otherwise, if a peak value of AF evaluation values had existed or the focus lens 104 is driven to an end of one side, actual peak values of horizontal and vertical AF evaluation values L and V are calculated in operation S110. Since the AF evaluation values not always have peak values at the calculated timings, the actual peak values may be obtained by an interpolation calculation as described with reference to FIG. 8. Otherwise, when the focus lens 104 is driven up to an end of one side and operation S110 starts, the horizontal AF evaluation values may be obtained by deduction.

In operation S111, whether a peak value Lpk of the horizontal AF evaluation value L is greater than a reference value is determined. If the peak value Lpk is greater than the reference value, AF adjustment is determined as possible and a target position of the focus lens 104 is set as a lens position at a timing that is determined as a timing where the peak value Lpk of the horizontal AF evaluation values is calculated, in operation S112.

Otherwise, if the peak value Lpk is determined to be smaller than the reference value, it is determined that AF detection is not able to be performed using horizontal contrast. Accordingly, whether a peak value Vpk of the vertical AF evaluation value V is greater than the reference value is determined, in operation S113. If it is determined that the peak value Vpk of the vertical AF evaluation value V is greater than the reference value, also, AF adjustment is determined as possible, and a target position of the focus lens 104 is set as a lens position at a timing that is determined as a timing where the peak value Vpk of the vertical AF evaluation value is calculated, in operation S114.

After setting the target position of the focus lens 104 in operation S112 or operation S114, the focus lens 104 is driven in a reverse direction to a direction the focus lens 104 is first driven to drive the focus lens 104 to the target position, in operation S115. In operation S116, it is displayed that the AF operation is successful.

Otherwise, if the peak value Lpk of the horizontal AF evaluation value L and the peak value Vpk of the vertical AF evaluation value V are determined as smaller than the reference value, it is determined that contrast is not clear to the subject in a horizontal direction and in a vertical direction. Accordingly, in operation S117, driving of the focus lens 104 is stopped, and NG denoting that AF adjustment is not successful is displayed in operation S118.

The AF operation A according to the current embodiment of the invention is completed according to the above-described operations.

Second Embodiment

Hereinafter, an AF operation using AF evaluation values, according to another embodiment of the invention, will be described with reference to FIG. 10 and FIGS. 11A and 11B.

Operation of Digital Photographing Apparatus

The structure and basic operation of the digital photographing apparatus 1 is the same as the first embodiment. Thus the description of the second embodiment will focus on the differences from the first embodiment. Here, a photographing period will be assumed as 120 fps, which is a higher speed than the first embodiment.

Figure 10:
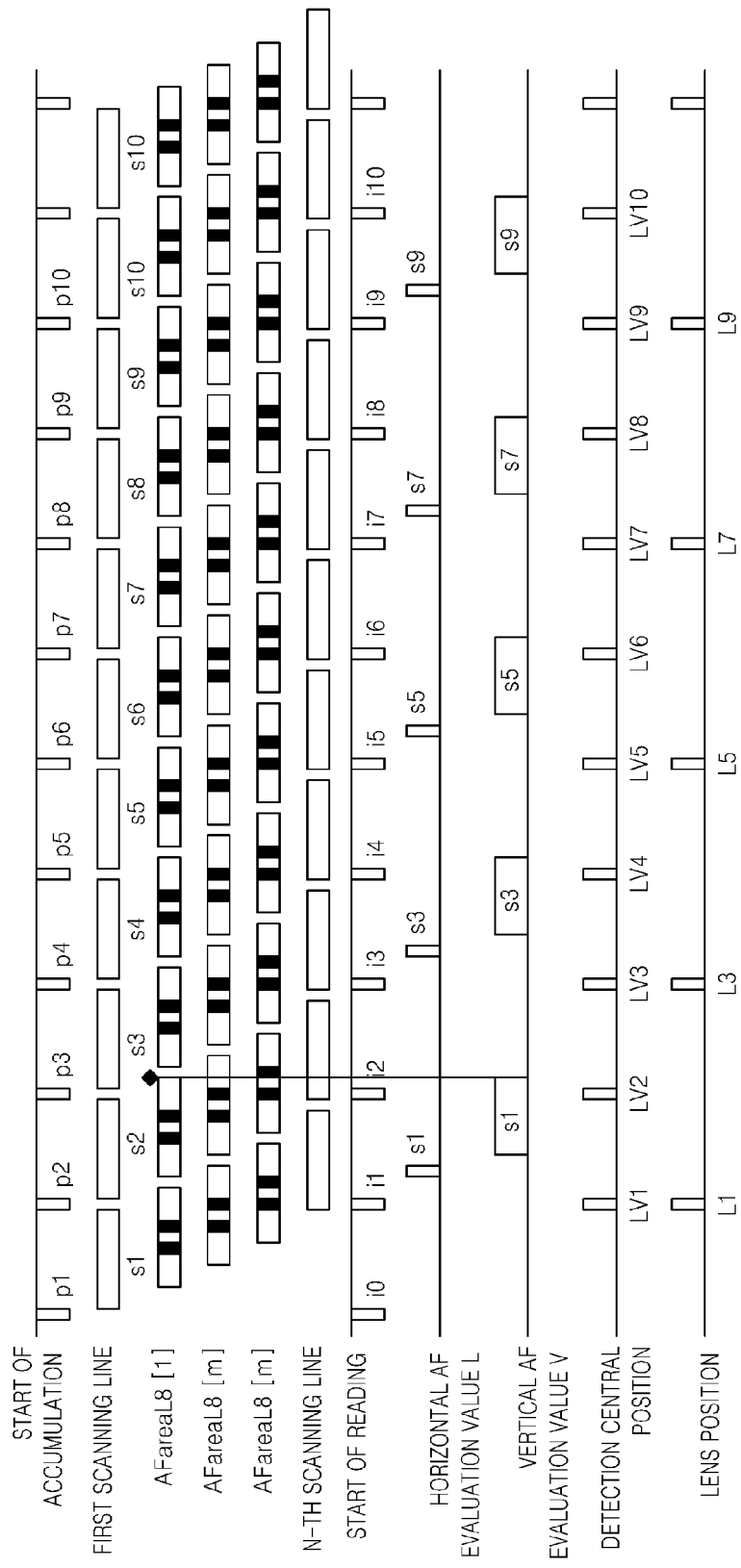
FIG. 10 is a timing diagram illustrating an AF operation of a digital photographing apparatus, according to another embodiment of the invention.

FIG. 10 is a timing diagram illustrating an AF operation of the digital photographing apparatus 1, according to another embodiment of the invention.

Referring to FIG. 10, an accumulation period of the imaging device 204 is half of the accumulation period of the first embodiment. Also, a scanning time of an AF detection area is also reduced according to the accumulation period, thereby outputting an image signal at a high speed. When reading of an image signal of an AF detection area by scanning of AFareaL8[1] through AFareaL8[a] is completed, a horizontal AF evaluation value L(s1) is calculated. Also, at the same time, an image signal of the area e8, which is an AF detection area, is stored in the memory 210. Then, an image signal is read in a vertical direction with respect to the image of the area e8 to calculate a vertical AF evaluation value V(s1) via an AF detection circuit of the pre processing unit 220.

However, according to the current embodiment, at a time point when the calculation of the vertical AF evaluation value V(s1) is completed, a scanning operation starts already in a second frame, and thus detection of a horizontal AF evaluation value is not able to be performed. However, in a third frame, since the timing is before a scanning operation starts in the third frame, a horizontal AF evaluation value and a vertical AF evaluation value may be calculated from an image signal of the third frame. Accordingly, by skipping the second frame, a horizontal AF evaluation value and a vertical AF evaluation value are calculated again in the third frame.

Even when the accumulation period of the imaging device 204 changes from 60 fps to 120 fps, a period of AF detection is still 60 fps. The change in the accumulation period may correspond to a case when an accumulation time is reduced because a subject is bright.

Once the horizontal AF evaluation value and the vertical AF evaluation value are calculated as described above, peak values of the horizontal and vertical AF evaluation values are calculated as in the first embodiment, thereby driving the focus lens 104 to a focus position.

According to the current embodiment of the invention, the horizontal AF evaluation value and the vertical AF evaluation value are calculated in odd-numbered frames but AF detection is skipped in even-numbered frames. Accordingly, a timing of a detection central position of AF detection may be LV1, LV2, . . . but detection central positions that are needed to calculate the peak values of the horizontal and vertical AF evaluation values are only odd-numbered values. Accordingly, the position of a lens may be also sensed at a timing that is synchronized with odd-numbered detection central positions.

Method of Controlling Digital Photographing Apparatus

Figure 11B:
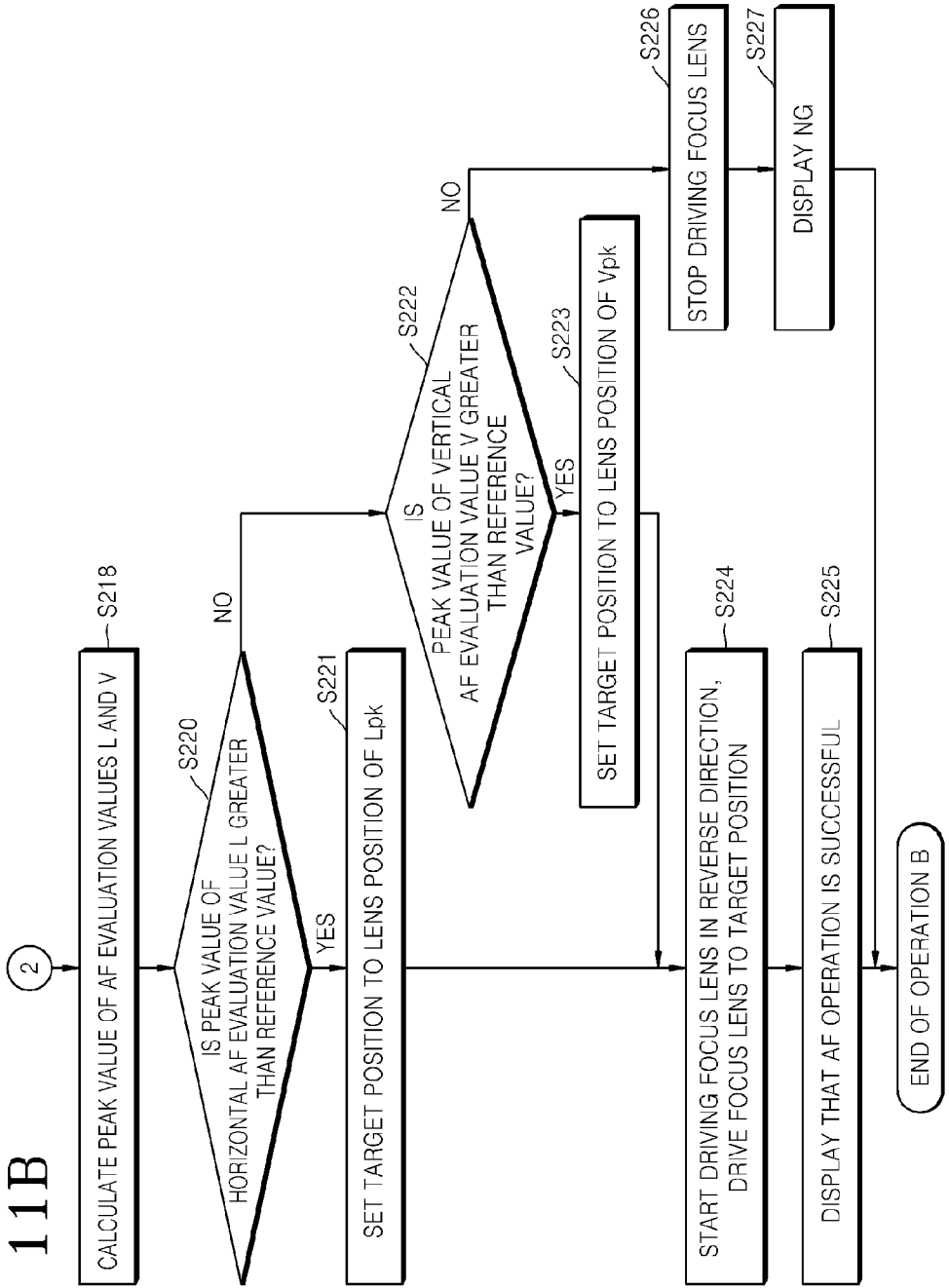

FIGS. 11A and 11B are flowcharts illustrating a method of FIG. 10 of controlling the digital photographing apparatus 1, according to another embodiment of the invention.

Power is supplied to the digital photographing apparatus 1, and when a shutter release button is half-pressed by the user, an AF operation B is started. When the AF operation B starts, an image is captured periodically by the imaging device 204 to generate an image signal in operation S201. In operation S202, whether a photographing period related to an accumulation period in the imaging device 204 is 60 fps or less is determined. If the photographing period is determined to be 60 fps or less, AF detection is performed by the AF operation A as in the first embodiment. Otherwise, if the photographing period is determined to be greater than 60 fps, the focus lens 104 is driven from one side to the other side in operation S203. In operation S204, the CPU 224 awaits application of an interrupt signal by a photographing timing signal. The photographing timing signal is a signal denoting a timing for initiating AF detection. According to the current embodiment, the AF operation is performed by interrupt controlling to the CPU 224 but the invention is not limited thereto. For example, an AF detection timing may be waited for while a driving signal generated by the imaging device control unit 205 is directly counted by the CPU 224.

When an interrupt signal of the photographing timing signal is input to the CPU 224, whether inputting of the interrupt signal has been performed an odd number of times is determined in operation S211. If inputting of the interrupt signal has been performed an even number of times, it is determined that it is a timing where calculation of AF evaluation values is not able to be performed as described with reference to FIG. 10, and thus inputting of an interrupt signal by a next photographing timing signal is waited for.

Otherwise, if inputting of an interrupt signal has been performed an odd number of times, an AF detection operation is performed in operations S212 through S227. Operations S212 through 227 are the same as operations S104 through S118 of FIG. 9B, respectively, and thus the description thereof will not be repeated here.

If it is determined that the horizontal and vertical AF evaluation values L and V have not passed peak values or the focus lens 104 is not driven to an end of one side, an interrupt signal is waited for again in operation S219.

The AF operation B according to the current embodiment of the invention is completed as in the above-described operations.

Third Embodiment

Hereinafter, an AF operation using AF evaluation values according to another embodiment of the invention will be described with reference to FIG. 12 and FIGS. 13A and 13B.

Operation of Digital Photographing Apparatus

The structure and basic operation of the digital photographing apparatus 1 is the same as the first embodiment. Thus the description of the third embodiment will focus on the differences from the first embodiment. Here, a photographing period will be assumed as 240 fps. However, the current embodiment may also be applied to a case in which a photographing period is shorter than 240 fps and the time for AF detection and calculation of vertical AF evaluation values by using a vertical image signal that is longer than the second embodiment.

Figure 12:
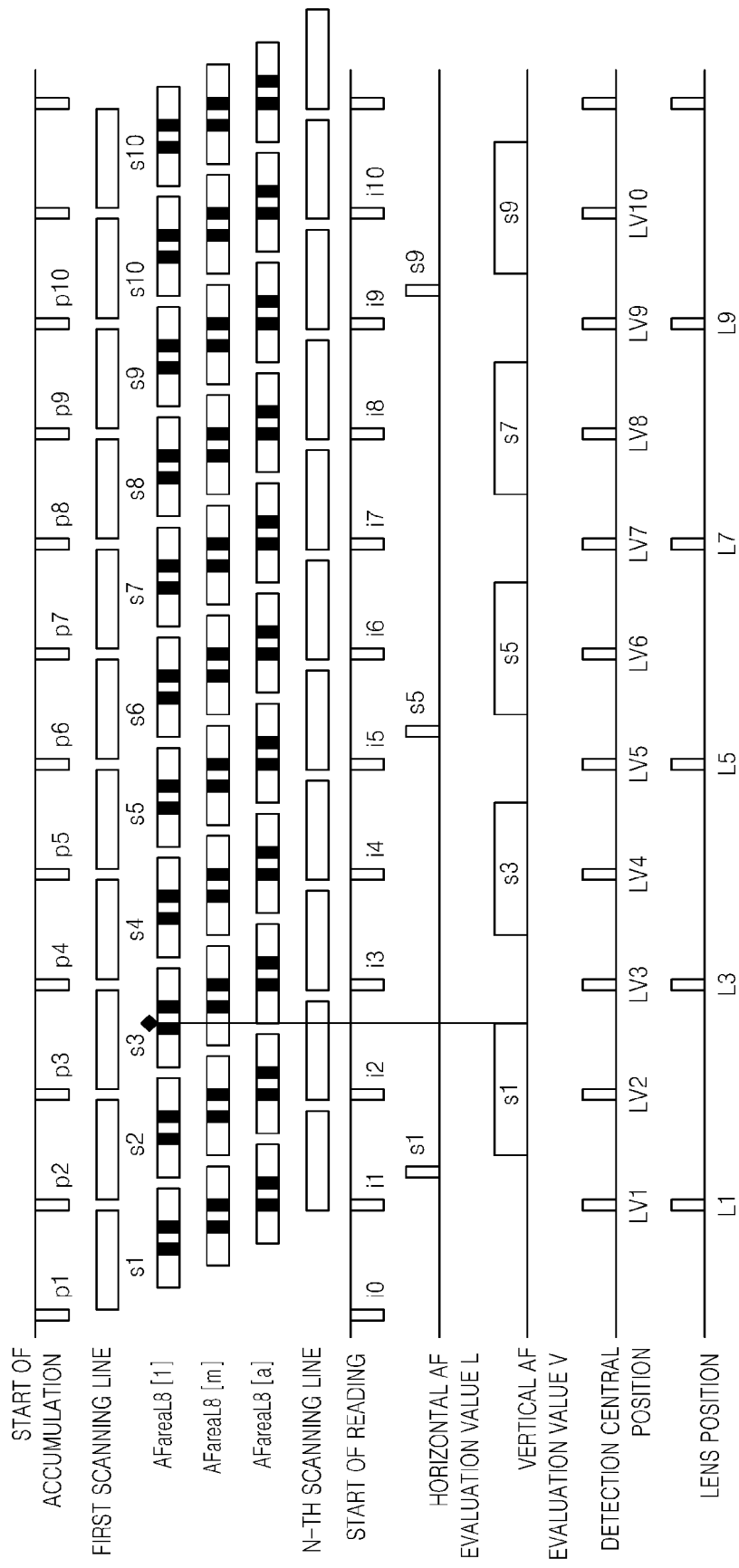
FIG. 12 is a timing diagram illustrating an AF operation of a digital photographing apparatus, according to another embodiment of the invention.

FIG. 12 is a timing diagram illustrating an AF operation of the digital photographing apparatus 1, according to another embodiment of the invention.

Referring to FIG. 12, an accumulation period of the imaging device 204 is half of that of the second embodiment. Also, the scanning time of an AF detection area is reduced according to the accumulation period, and thus an image signal is read at a high speed. When reading of the image signal of an AF detection area by scanning of AFareaL8[1] through AFareaL8[$a$] is completed, a horizontal AF evaluation value L(s1) is calculated. At the same time, an image signal of an area e8, which is an AF detection area, is stored in the memory 210. Then, an image signal is read in a vertical direction with respect to the image of the area e8 to calculate a vertical AF evaluation value V(s1) via an AF detection circuit of the pre processing unit 220.

However, according to the current embodiment, a scanning operation starts in second and third frames already at a time point where calculation of the vertical AF evaluation value V(s1) is completed, and thus detection of the horizontal AF evaluation value is not able to be performed. However, there is still time before a start of a scanning operation of a fourth frame, and an AF evaluation is calculated additionally during the time. However, if a horizontal AF evaluation value is calculated again after the vertical AF evaluation value V(s1), then consequently, AF evaluation values are calculated for every third frame. According to the current embodiment, it is impossible to calculate a horizontal AF evaluation value from an image signal of a third frame; however an image signal of the third frame is stored in the memory 210 and then a vertical AF evaluation value V(s3) is calculated again by using the stored image signal. After calculation of the vertical AF evaluation value V(s3) is completed, a horizontal AF evaluation signal is calculated again from a fifth frame. The horizontal AF evaluation value may be calculated at a period of 60 fps using the above-described method, and a vertical AF evaluation value may be calculated at a period of 120 fps.

According to the current embodiment, the calculation of the horizontal AF evaluation value and/or the vertical AF evaluation value is performed in odd-numbered frames, but an AF detection operation is skipped in even-numbered frames. Accordingly, there are timings LV1, LV2, . . . of a detection central position of AF detection but detection central positions needed for calculation of peak values of the horizontal and vertical AF evaluation values are only odd-numbered. Thus, a lens position only needs to be sensed at timings that are synchronized with the odd-numbered detection central positions.

Method of Controlling Digital Photographing Apparatus

Figure 13A:
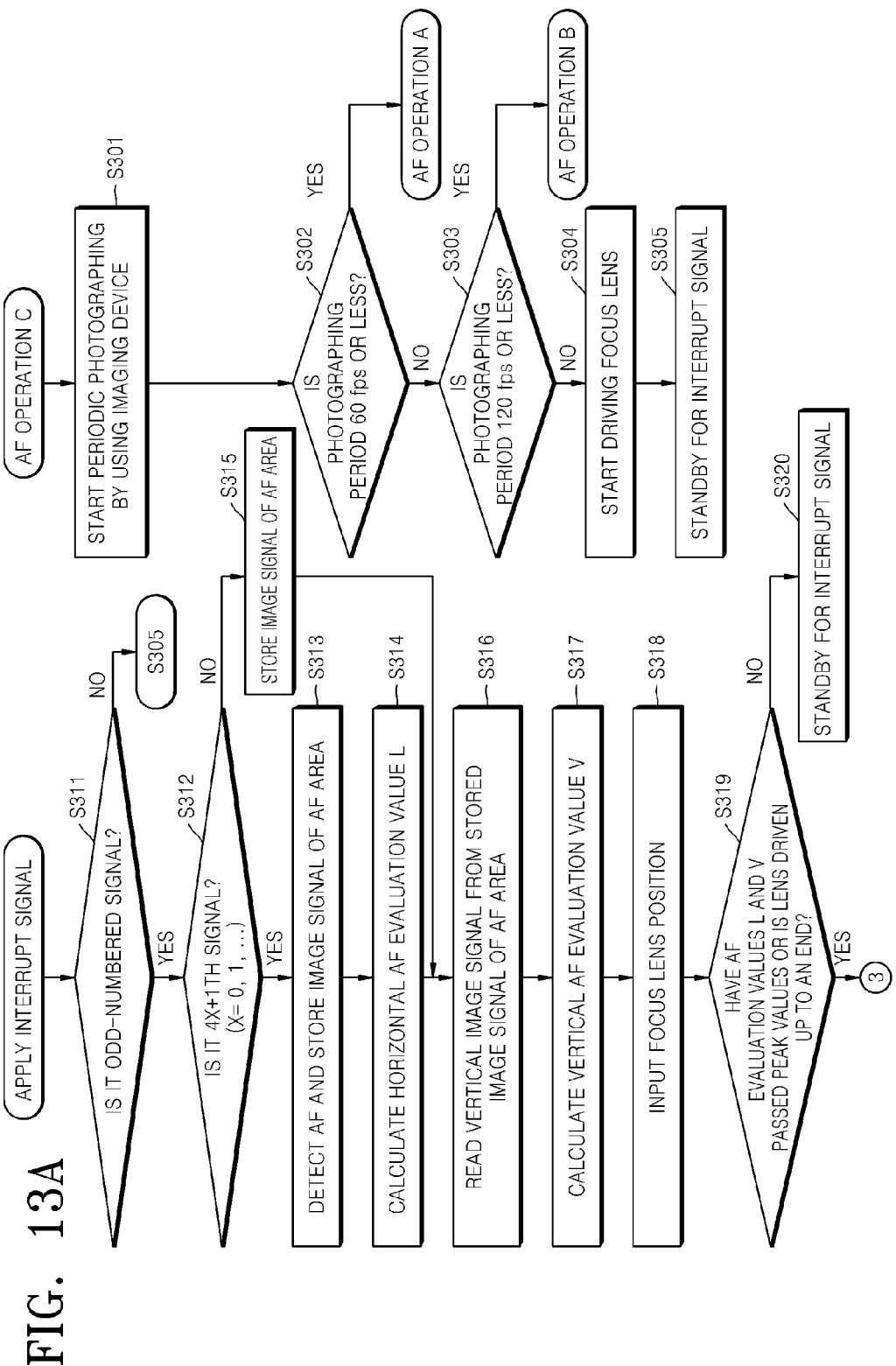
FIGS. 13A and 13B are a flowchart illustrating a method of FIG. 12 of controlling a digital photographing apparatus, according to an embodiment of the invention.
Figure 13B:
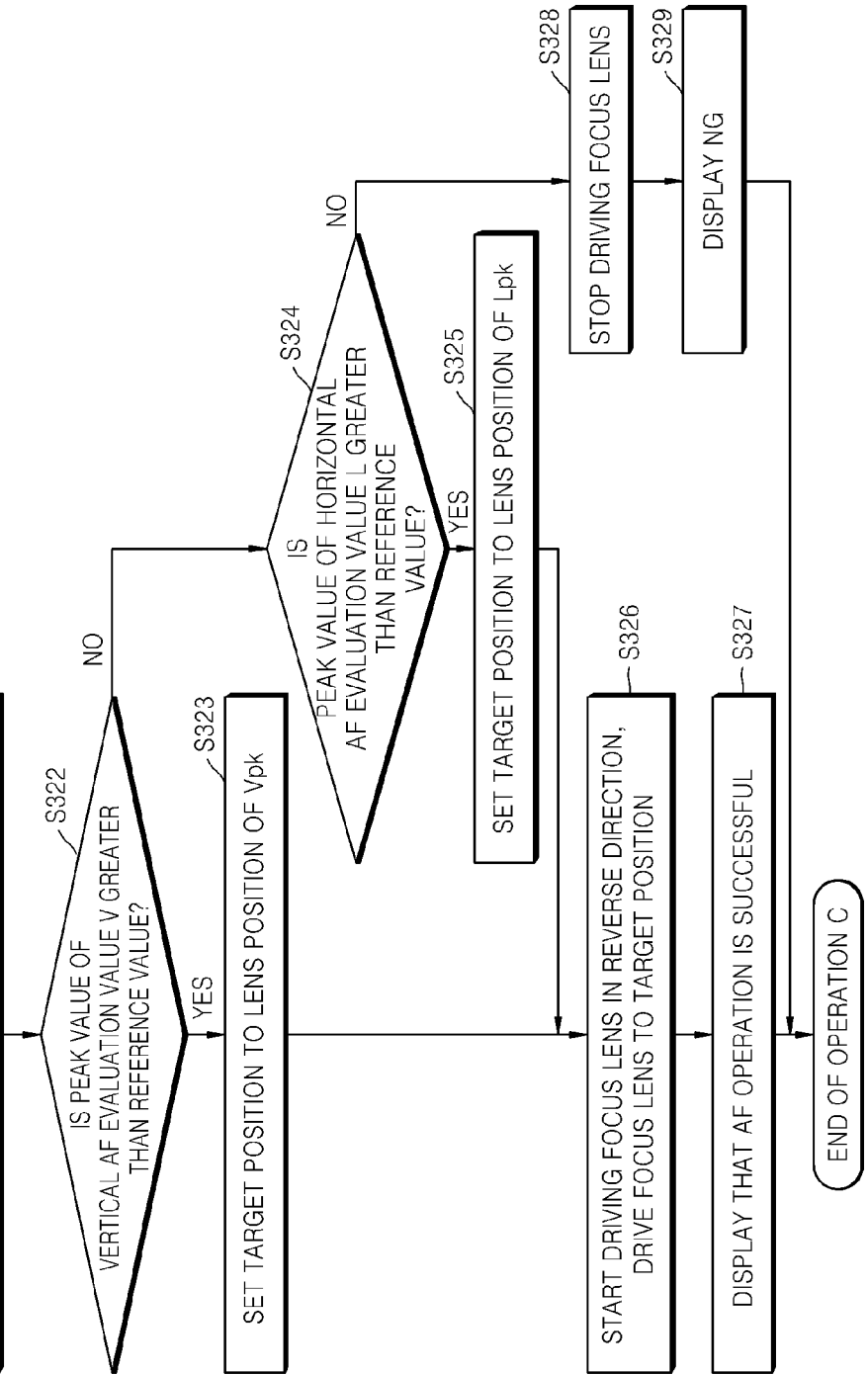

FIGS. 13A and 13B are a flowchart illustrating a method of FIG. 12 of controlling the digital photographing apparatus 1, according to another embodiment of the invention.

Power is supplied to the digital photographing apparatus 1, and when a shutter release button is half-pressed by the user, an AF operation C is started. When the AF operation C starts, an image is captured periodically by the imaging device 204 to generate an image signal in operation S301. In operation S302, whether a photographing period related to the accumulation period in the imaging device 204 is 60 fps or less is determined. If the photographing period is determined to be 60 fps or less, AF detection is performed by the AF operation A as in the first embodiment. Otherwise, if the photographing period is determined to be greater than 60 fps, whether a photographing period is 120 fps or less is determined in operation S303. If it is determined that the photographing period is 120 fps or less, AF detection is performed using an AF operation B as in the second embodiment. Otherwise, if it is determined that a photographing period is greater than 120 fps, the focus lens 104 is driven from one side to the other side in operation S304. Then, in operation S305, the CPU 224 waits for application of an interrupt signal by a photographing timing signal.

When an interrupt signal of the photographing timing signal is input to the CPU 224, whether the inputting of the interrupt signal has been performed an odd number of times is determined in S311. If inputting of an interrupt signal has been performed an even number of times, it is determined that the calculation of AF evaluation values is not able to be performed, as described with reference to FIG. 12, and thus inputting of an interrupt signal by a next photographing timing signal is waited for.

Otherwise, in operation S312, if inputting of an interrupt signal has been performed an odd number of times, whether the inputting has been performed 4X+1 times (X=0, 1, 2 . . . ) is determined. When inputting the interrupt signal satisfies the above condition, an image signal of an AF area is input from the imaging device 204 to an AF detection circuit of the pre processing unit 220 in the camera control unit 209 to perform AF detection. At the same time, the image signal of the AF area is stored in the memory 210 in operation S313. In operation S314, a horizontal AF evaluation value L is calculated by the AF detection.

Otherwise if the inputting of an interrupt signal does not satisfy the condition, as has been described above with reference to FIG. 12, it is determined that it is a timing where the calculation of a horizontal AF evaluation value among the AF evaluation values is not able to be performed and the image signal of the AF area is temporarily stored in the memory 210 in operation S315, and then the method proceeds to operation S316.

AF detection is performed by operations S316 through S329. Operations S316 through S329 are the same as operations S106 through S118 of FIG. 9A and FIG. 9B or operations S214 through S227 of FIG. 11A and FIG. 11B, and thus the description thereof will not be repeated.

The AF operation C according to the current embodiment of the invention is completed by the above-described operations.

Fourth Embodiment

Hereinafter, an AF operation using AF evaluation values, according to another embodiment of the invention, will be described with reference to FIGS. 14, 15, 16A, and 16B.

Operation of Digital Photographing Apparatus

The structure and basic operation of the digital photographing apparatus 1 is the same as the first embodiment. Thus the description of the fourth embodiment will focus on the differences from the first embodiment. Here, a photographing period will be assumed as 240 fps. However, the current embodiment may also be applied to a case in which a photographing period is shorter than 240 fps and the time for AF detection and calculation of vertical AF evaluation values by using a vertical image signal is longer than the second embodiment.

Figure 14:
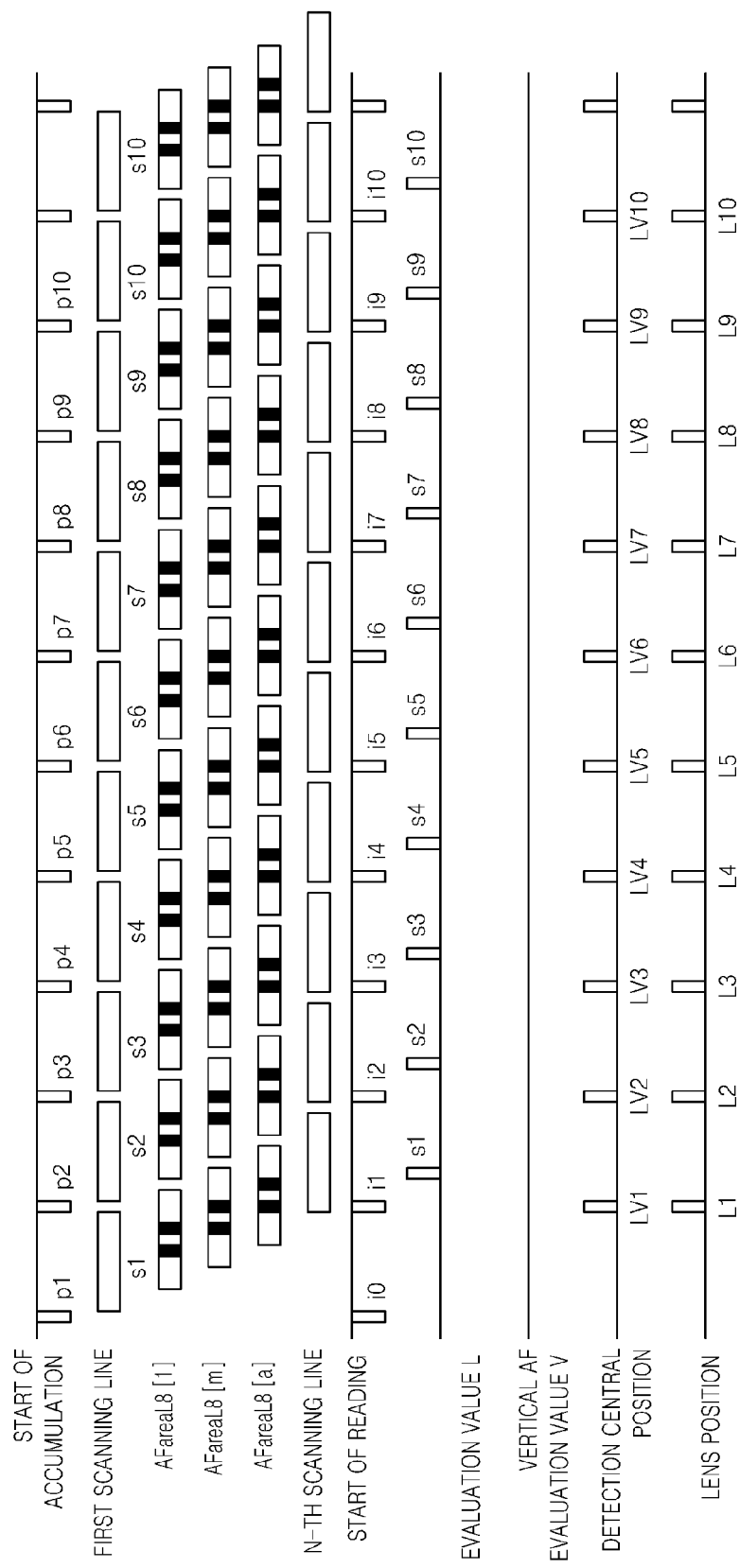
FIGS. 14 and 15 are timing diagrams illustrating AF operations of a digital photographing apparatus, according to embodiments of the invention.
Figure 15:
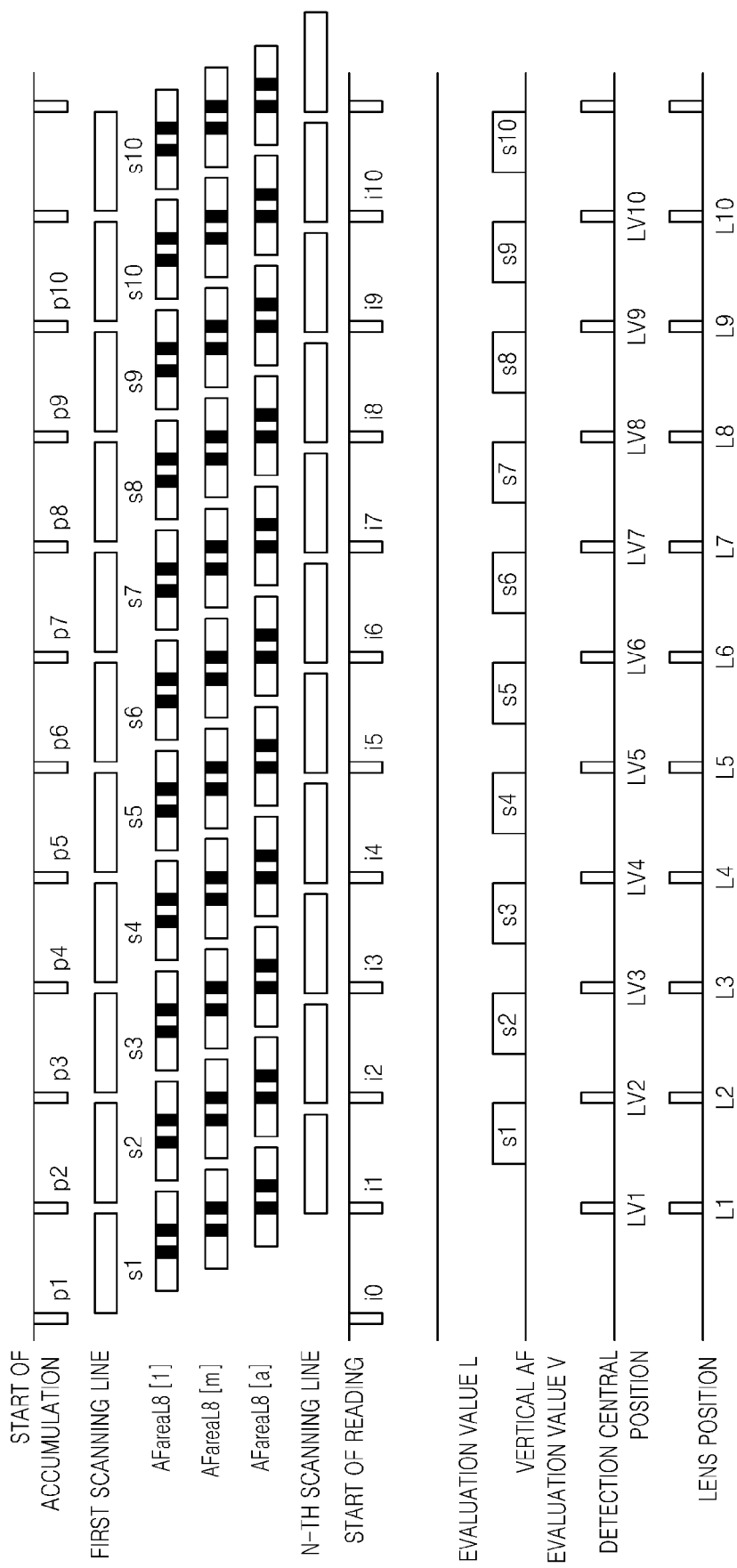

FIGS. 14 and 15 are timing diagrams illustrating AF operations of the digital photographing apparatus 1 of FIG. 1, according to other embodiments of the invention.

Referring to FIG. 14, an accumulation period of the imaging device 204 is half of that of the second embodiment. Also, the scanning time of an AF detection area is reduced according to the accumulation period, and thus an image signal is read at high speed. When reading of the image signal of the AF detection area by scanning of AFareaL8[1] through AFareaL8[a] is completed, a horizontal AF evaluation value L(s1) is calculated. Unlike other embodiments, subsequent horizontal AF evaluation values L(s2), L(s3), . . . are sequentially calculated by using an image signal of a next frame. Calculation of vertical AF evaluation values is not performed, and thus there is no need to store the read horizontal image signals in the memory 210.

A target position of the focus lens 104 may be calculated by using the calculated horizontal AF evaluation values.

Referring to FIG. 15, a horizontal AF evaluation value is not calculated with respect to the read horizontal image signals in the imaging device 204 but the read horizontal image signals are first stored in the memory 210, and when all of the image signals corresponding to AF detection areas are stored in the memory 210, vertical image signals are sequentially read to calculate a vertical AF evaluation value V(s1). Similar to FIG. 14, vertical AF evaluation values are continuously calculated. Here, while an image signal of a next frame is read while calculating a vertical AF evaluation value in a first frame, the calculation of vertical AF evaluation values may be possible for every frame by storing the read horizontal image signal in the memory 210.

By using the calculated vertical AF evaluation values, a target position of the focus lens 104 may be calculated.

During the AF operation, the focus lens 104 is first driven from one side to the other side, and after the focus lens 104 is completely driven up to the other side, the focus lens 104 is driven in a reverse direction. Thus, AF detection is performed by using the horizontal AF evaluation values at a first time of driving as illustrated in FIG. 14, and then at a second time of driving, AF detection may be performed by using the vertical AF evaluation values as illustrated in FIG. 15.

According to the above-described embodiments, there are frames for which AF detection is skipped. This results in inexact detection of peak values of AF evaluation values and thus an exact AF operation is not able to be performed. However, according to the current embodiment, since AF detection is performed with respect to all frames, a more exact AF operation may be performed.

Method of Controlling Digital Photographing Apparatus

Figure 16A:
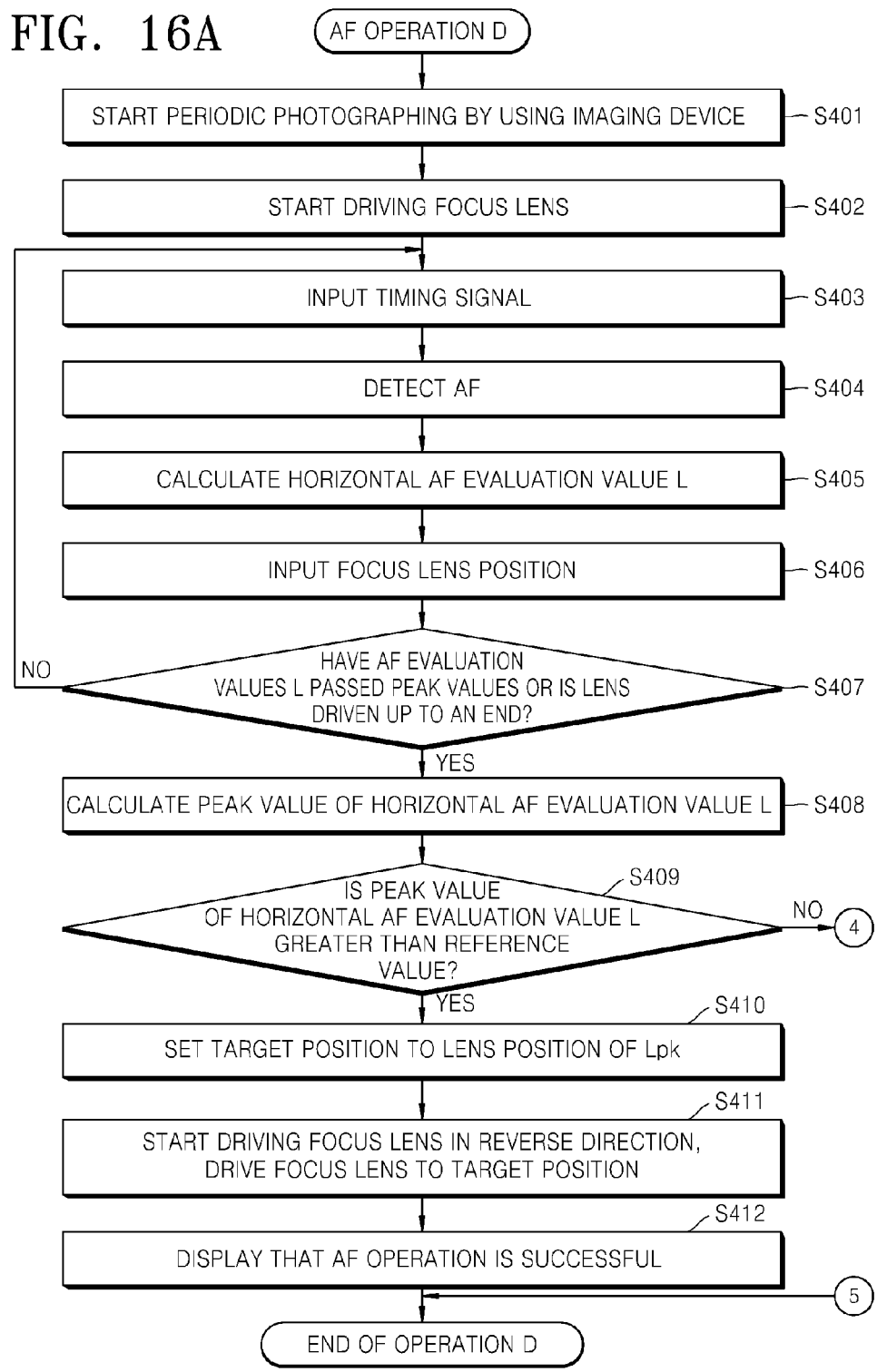
FIGS. 16A and 16B are a flowchart illustrating methods of FIGS. 14 and 15 of controlling the digital photographing apparatus, according to an embodiment of the invention.
Figure 16B:
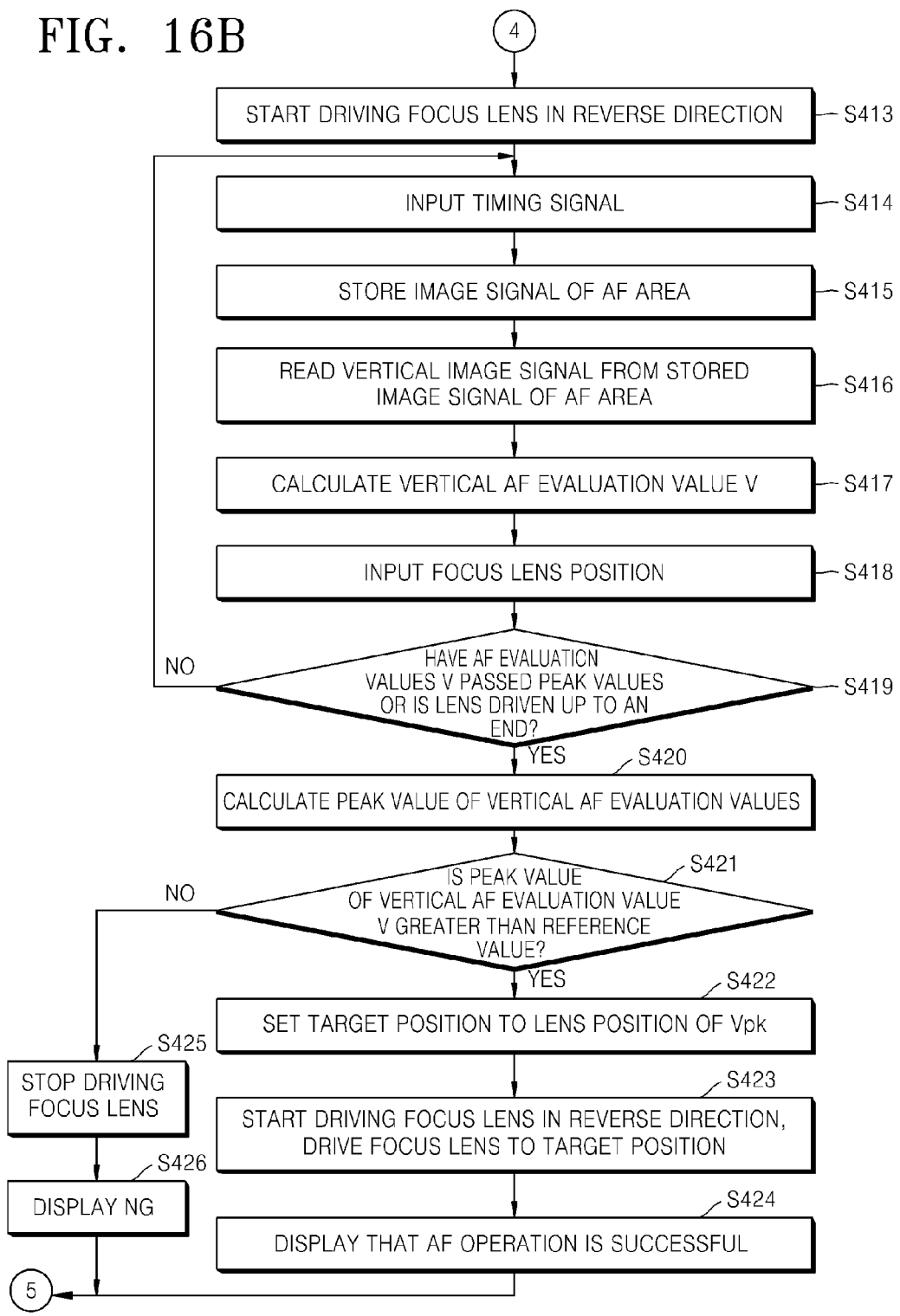

FIGS. 16A and 16B are a flowchart illustrating methods of FIGS. 14 and 15 controlling the digital photographing apparatus 1, according to another embodiment of the invention.

Power is supplied to the digital photographing apparatus 1, and when a shutter release button is half-pressed by the user, an AF operation D is started. When the AF operation D is started, an image is captured periodically by the imaging device 204 to generate an image signal in operation S401. In operation S402, since an AF operation is performed using a contrast AF method, the focus lens 104 is driven from one side to the other side. In operation S403, a photographing timing signal is input to the CPU 224. The photographing timing signal is a signal denoting a timing for initiating AF detection. The signal is generated in correspondence with a set AF detection area. The CPU 224 counts a frequency of a driving signal is generated by the imaging device control unit 205, and determines a timing at which a predetermined frequency is counted as a timing for initiating AF detection.

In operation S404, when the photographing timing signal is input, AF detection is performed by inputting an image signal of the AF area from the imaging device 204 to an AF detection circuit of the pre processing unit 220 in the camera control unit 209. In operation S405, a horizontal AF evaluation value L is calculated by AF detection. In operation S406, position information of the focus lens 104 at the timing of AF detection is obtained and recorded together with AF evaluation values in a set.

In operation S407, while calculating the horizontal AF evaluation value L, whether the horizontal AF evaluation L has passed a peak value or the focus lens 104 is driven to an end of one side is determined. Since the method of determining whether the horizontal AF evaluation value L passes the peak value has been described with reference to the first embodiment, description thereof will not be repeated. If the focus lens 104 is not driven up to an end of one side yet and a peak value is not detected, the method goes back to operation S403 to calculate horizontal AF evaluation values.

In operation S408, otherwise, if a peak value of the horizontal AF evaluation value exists or the focus lens 104 is driven to an end of one side, an actual peak value of the horizontal AF evaluation value L is calculated. Since the horizontal AF evaluation value does not always have a peak value at the calculated timing, the peak value may be obtained by an interpolation calculation as has been described with reference to FIG. 8. Otherwise, if the focus lens 104 is driven to an end of one side and the method starts operation S408, the horizontal AF evaluation value may be obtained by deduction.

In operation S409, whether a peak value Lpk of the horizontal AF evaluation value L is greater than a reference value is determined. In operation S410, if the peak value Lpk is determined to be greater than the reference value, it is determined that AF adjustment is possible and thus a target position of the focus lens 104 is set as a lens position at a timing that is determined to be a timing where the peak value Lpk of the horizontal AF evaluation value is calculated. In operation S411, when the target position of the focus lens 104 is set, the focus lens 104 is driven in a reverse direction to a direction the focus lens 104 is initially driven, and the focus lens 104 is driven to the target position. In operation S412, it is displayed that the AF operation is successful.

In operation S413, otherwise, if it is determined that the peak value Lpk is not greater than the reference value, the focus lens 104 is driven in the reverse direction, and in operation S414, a photographing timing signal is applied again. In operation S415, image signals of images that are captured while the focus lens 104 is driven in the reverse direction are sequentially read and stored in the memory 210. The stored image signal may be all of the image signals or image signals included in the AF area.

In operation S416, when all of the image signals included in the AF area are stored, vertical image signals of the image signals of the AF area are sequentially read from the memory 210. Reading of the image signal from the memory 210 may be performed using a DMA method. In operation S417, a vertical AF evaluation value V is calculated by inputting the read vertical image signals to the AF detection circuit. In operation S418, position information of the focus lens 104 at the AF detection timing is obtained and recorded together with the vertical AF evaluation values in a set.

In operation S419, while calculating the vertical AF evaluation values V, whether the vertical AF evaluation values V have passed a peak value or the focus lens 104 is driven to an end of one side is determined. Since the method of determining whether an AF evaluation value has passed the peak value has been described with reference to the first embodiment, description thereof will not be repeated. If the focus lens 104 is not driven up to an end of one side yet and a peak value is not detected, the method goes back to operation S414 to calculate vertical AF evaluation values.

In operation S420, otherwise, if a peak value of the vertical AF evaluation values exists or the focus lens 104 is driven to an end of one side, an actual peak value of the vertical AF evaluation value V is calculated. Since the vertical AF evaluation values do not always have a peak value at the calculated timing, the peak value may be obtained by an interpolation calculation as described above with reference to FIG. 8. Otherwise, when the focus lens 104 is driven to an end of one side and the method starts operation S420, AF evaluation values may be obtained by deduction.

In operation S421, whether a peak value Vpk of the vertical AF evaluation values V is greater than a reference value is determined. In operation S410, if the peak value Vpk is determined to be greater than the reference value, it is determined that AF adjustment is possible and thus a target position of the focus lens 104 is set as a lens position at a timing that is determined to be a timing where the peak value Vpk of the vertical AF evaluation values is calculated. In operation S422, when the target position of the focus lens 104 is set, the focus lens 104 is driven in a reverse direction to a direction the focus lens 104 is initially driven, and the focus lens 104 is driven to the target position in operation S423. In operation S424, it is displayed that the AF operation is successful.

The AF operation D according to the current embodiment of the invention is completed using the above-described operations.

As described above, the digital photographing apparatus according to the embodiments of the invention performs an AF operation by using not only horizontal AF evaluation values that are calculated using horizontal image signals but also vertical AF evaluation values that are calculated by using vertical image signals, thereby capturing an image with a focal point adjusted also with respect to a subject that has no contrast in a horizontal direction.

Programs for executing the method of performing AF detection according to the embodiments of the invention in the digital photographing apparatus may be stored in a recording medium. The recording medium may be the memory 210 as illustrated in FIG. 3 or other recording media. Examples of the recording medium include magnetic storage media (e.g., hard disks, etc.), optical recording media (e.g., digital versatile discs (DVDs)).

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components that perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

What is claimed is:

1. A digital photographing apparatus comprising:
an imaging device comprising a plurality of photoelectric converting units for converting image light from a subject into an electric signal to generate an image signal;
an imaging device control unit for generating a timing signal and controlling such that horizontal image signals are sequentially read among the image signals in synchronization with the timing signal;
a memory for storing the read horizontal image signals;
an autofocus (AF) evaluation value calculation unit for calculating horizontal AF evaluation values by using the sequentially read horizontal image signals and calculating vertical AF evaluation values by sequentially reading vertical image signals from the image signals stored in the memory; and
a main control unit for performing an AF operation by using the horizontal AF evaluation values or the vertical AF evaluation values,
wherein a period of calculating horizontal AF evaluation values and a period of calculating vertical AF evaluation values by the AF evaluation value calculation unit do not overlap,
wherein when the calculation of the horizontal AF evaluation values is completed, the vertical AF evaluation values are calculated before reading horizontal image signals of AF area of a next frame period, and
wherein the calculation of horizontal AF evaluation values and the calculation of vertical AF evaluation values are completed within one frame period.

2. The digital photographing apparatus of claim 1, wherein the horizontal AF evaluation values and the vertical AF evaluation values are calculated for every predetermined number of timing signals based on a speed of reading the horizontal image signals.

3. The digital photographing apparatus of claim 2, wherein the predetermined number varies according to a period of the timing signal.

4. The digital photographing apparatus of claim 1, wherein a ratio of the horizontal AF evaluation values and the vertical AF evaluation values varies according to time needed for calculation of the vertical AF evaluation values.

5. The digital photographing apparatus of claim 1, wherein the main control unit performs an AF operation by using the vertical AF evaluation values when the horizontal AF evaluation values are less than a reference value or by using the horizontal AF evaluation values when the vertical AF evaluation values are less than a reference value.

6. The digital photographing apparatus of claim 1, wherein when a focus position is not to be detected by using either the horizontal AF evaluation values or the vertical AF evaluation values, the focus position is detected by using other AF evaluation values.

7. The digital photographing apparatus of claim 6, wherein the main control unit performs an AF operation by using the horizontal AF evaluation values while driving a lens from one side to another side, and an AF operation is performed by using the vertical AF evaluation values while driving the lens in a reverse direction.

8. The digital photographing apparatus of claim 1, wherein the horizontal image signals are stored in the memory at a same time with the calculation of the horizontal AF evaluation values.

9. The digital photographing apparatus of claim 1, wherein the AF evaluation value calculation unit starts calculation of the vertical AF evaluation values when all of the image signals included in the AF area are stored in the memory by reading the horizontal image signals.

10. A method of controlling a digital photographing apparatus, the method comprising:
- generating an image signal by converting image light from a subject into an electric signal;
- sequentially reading horizontal image signals among the image signal in synchronization with a timing signal;
- storing the read horizontal image signals;
- calculating a horizontal AF evaluation value by using the sequentially read horizontal image signals;
- sequentially reading vertical image signals from the image signal stored in a memory;
- calculating a vertical AF evaluation value by using the read vertical image signals; and
- performing an AF operation by using the horizontal AF evaluation values or the vertical AF evaluation values,
- wherein a period of calculating horizontal AF evaluation values and a period of calculating vertical AF evaluation values by the AF evaluation value calculation unit do not overlap,
- wherein when the calculation of the horizontal evaluation values is completed, the vertical AF evaluation values are calculated before reading horizontal image signals of AF area of next frame period, and
- wherein the calculation of horizontal AF evaluation values and the calculation of vertical AF evaluation values are completed within one frame period.

11. The method of claim 10, wherein the horizontal AF evaluation values and the vertical AF evaluation values are calculated for every predetermined number of timing signals based on a speed of reading the horizontal image signals.

12. The method of claim 11, wherein the predetermined number varies according to a period of the timing signal.

13. The method of claim 10, wherein a ratio of the horizontal AF evaluation values and the vertical AF evaluation values varies according to time needed for calculation of the vertical AF evaluation values.

14. The method of claim 10, wherein the AF operation is performed by using the vertical AF evaluation values when the horizontal AF evaluation values are less than a reference value or by using the horizontal AF evaluation values when the vertical AF evaluation values are less than a reference value.

15. The method of claim 10, wherein when a focus position is not to be detected by using either the horizontal AF evaluation value or the vertical AF evaluation value, the focus position is detected by using other AF evaluation values.

16. The method of claim 15, wherein the AF operation is performed by using the horizontal AF evaluation values while driving a lens from one side to another side, and the AF operation is performed by using the vertical AF evaluation values while driving the lens in a reverse direction.

17. The method of claim 10, wherein the horizontal image signals are stored in the memory at the same time with the calculation of the horizontal AF evaluation values.

18. The method of claim 10, wherein calculation of the vertical AF evaluation values starts when all of the image signals included in the AF area are stored in the memory by reading the horizontal image signals.

19. A digital photographing apparatus comprising:
- an imaging device comprising a plurality of photoelectric converting units for converting image light from a subject into an electric signal to generate an image signal;
- an imaging device control unit for generating a timing signal and controlling such that horizontal image signals are sequentially read among the image signals in synchronization with the timing signal;
- a memory for storing the read horizontal image signals;
- an autofocus (AF) evaluation value calculation unit for calculating vertical AF evaluation values by sequentially reading vertical image signals from the image signals stored in the memory; and
- a main control unit for performing an AF operation by using the vertical AF evaluation values,
- wherein a period of calculating horizontal AF evaluation values and a period of calculating vertical AF evaluation values by the AF evaluation value calculation unit do not overlap,
- wherein when the calculation of the horizontal evaluation values is completed, the vertical AF evaluation values are calculated before reading horizontal image signals of AF area of next frame period, and
- wherein the calculation of horizontal AF evaluation values and the calculation of vertical AF evaluation values are completed within one frame period.

* * * * *